(12) United States Patent  
Fujimoto et al.

(10) Patent No.: US 8,801,019 B2  
(45) Date of Patent: Aug. 12, 2014

(54) WORKING VEHICLE

(71) Applicant: Kubota Corporation, Osaka (JP)

(72) Inventors: Hiroo Fujimoto, Sakai (JP); Daisuke Yasunobe, Sakai (JP); Daisuke Inaba, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/799,909

(22) Filed: Mar. 13, 2013

(65) Prior Publication Data

US 2014/0097591 A1 Apr. 10, 2014

(30) Foreign Application Priority Data

Jul. 27, 2012 (JP) .................................. 2012-167594  
Jul. 27, 2012 (JP) .................................. 2012-167595

(51) Int. Cl.
*B60R 3/00* (2006.01)
(52) U.S. Cl.
CPC ........................................ *B60R 3/00* (2013.01)
USPC ......................................................... 280/163
(58) Field of Classification Search
CPC .............. B60R 3/00; B60R 3/002; B60R 3/02
USPC ................................................. 280/163–166
See application file for complete search history.

(56) References Cited

U.S. PATENT DOCUMENTS

| 3,863,729 | A | * | 2/1975 | Von Fummetti et al. | ..... 180/69.2 |
| 4,074,786 | A | * | 2/1978 | Joubert | ........................ 180/68.5 |
| 6,116,378 | A | * | 9/2000 | Barrow | .......................... 182/127 |
| 7,185,904 | B1 | * | 3/2007 | Jones et al. | .................... 280/166 |
| 7,354,050 | B2 | * | 4/2008 | Brockway | ......................... 280/66 |
| 2009/0266639 | A1 | * | 10/2009 | Kuramoto et al. | ............ 180/315 |
| 2011/0091307 | A1 | * | 4/2011 | Yasuda et al. | ................. 414/685 |

FOREIGN PATENT DOCUMENTS

| JP | 8108754 A | 4/1996 |
| JP | 2006329301 A | 12/2006 |
| JP | 2007125931 A | 5/2007 |

* cited by examiner

*Primary Examiner* — John Walters  
*Assistant Examiner* — James Triggs  
(74) *Attorney, Agent, or Firm* — The Webb Law Firm

(57) ABSTRACT

The cover member has an outer edge portion configured by the upper end extending portion, the front end extending portion, and the rear end extending portion in which a front end of the upper end extending portion and an upper end of the front end extending portion are connect to each other, and a rear end of the upper end extending portion and an upper end of the rear end extending portion are connected to each other.

7 Claims, 15 Drawing Sheets

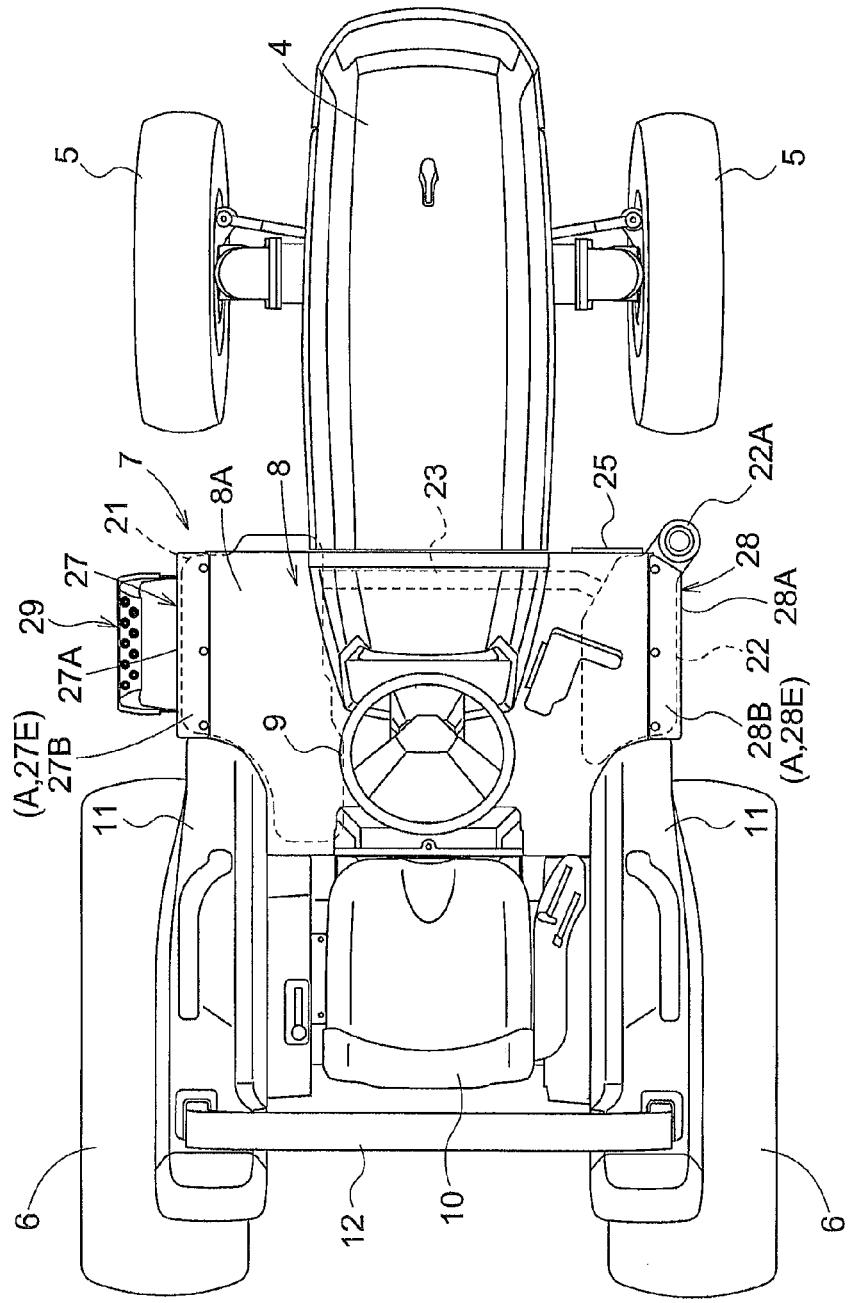

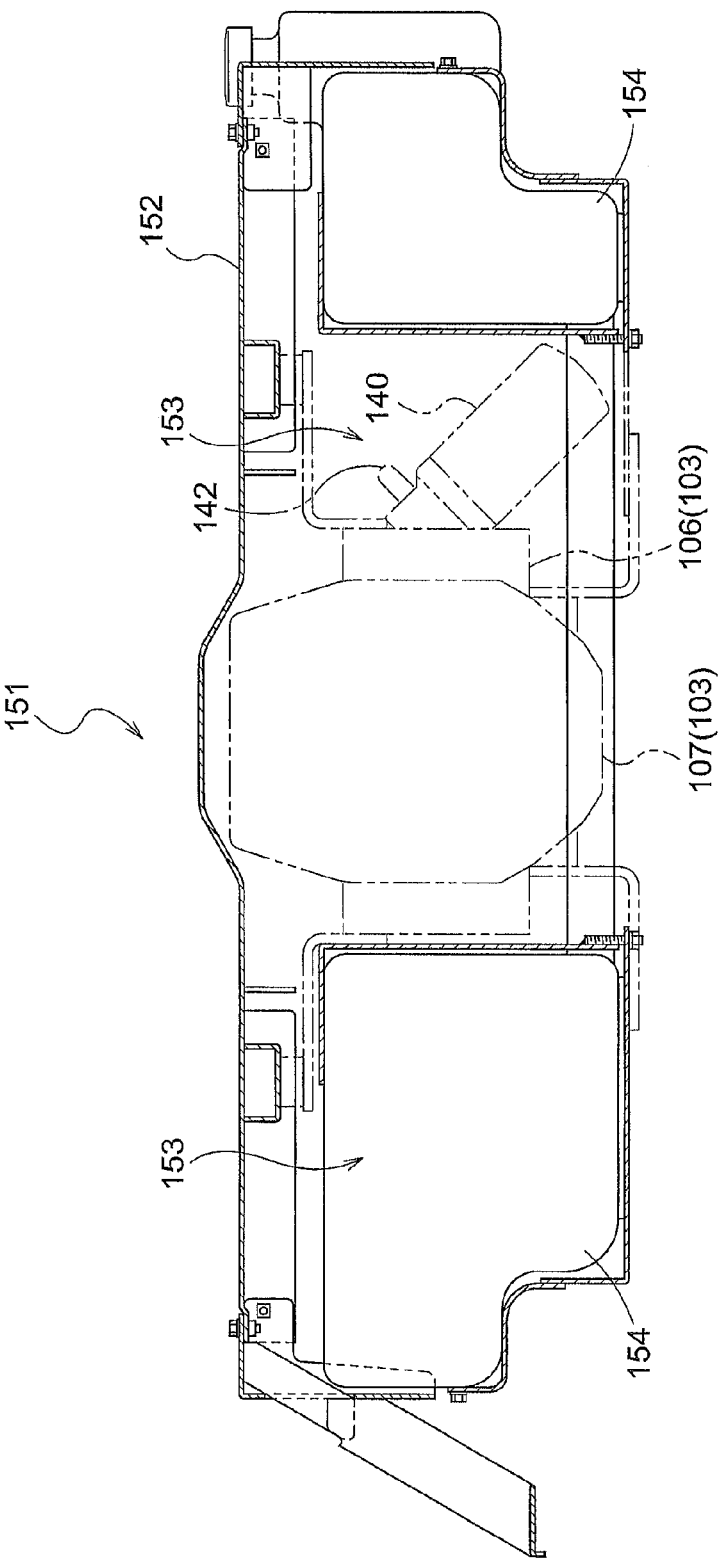

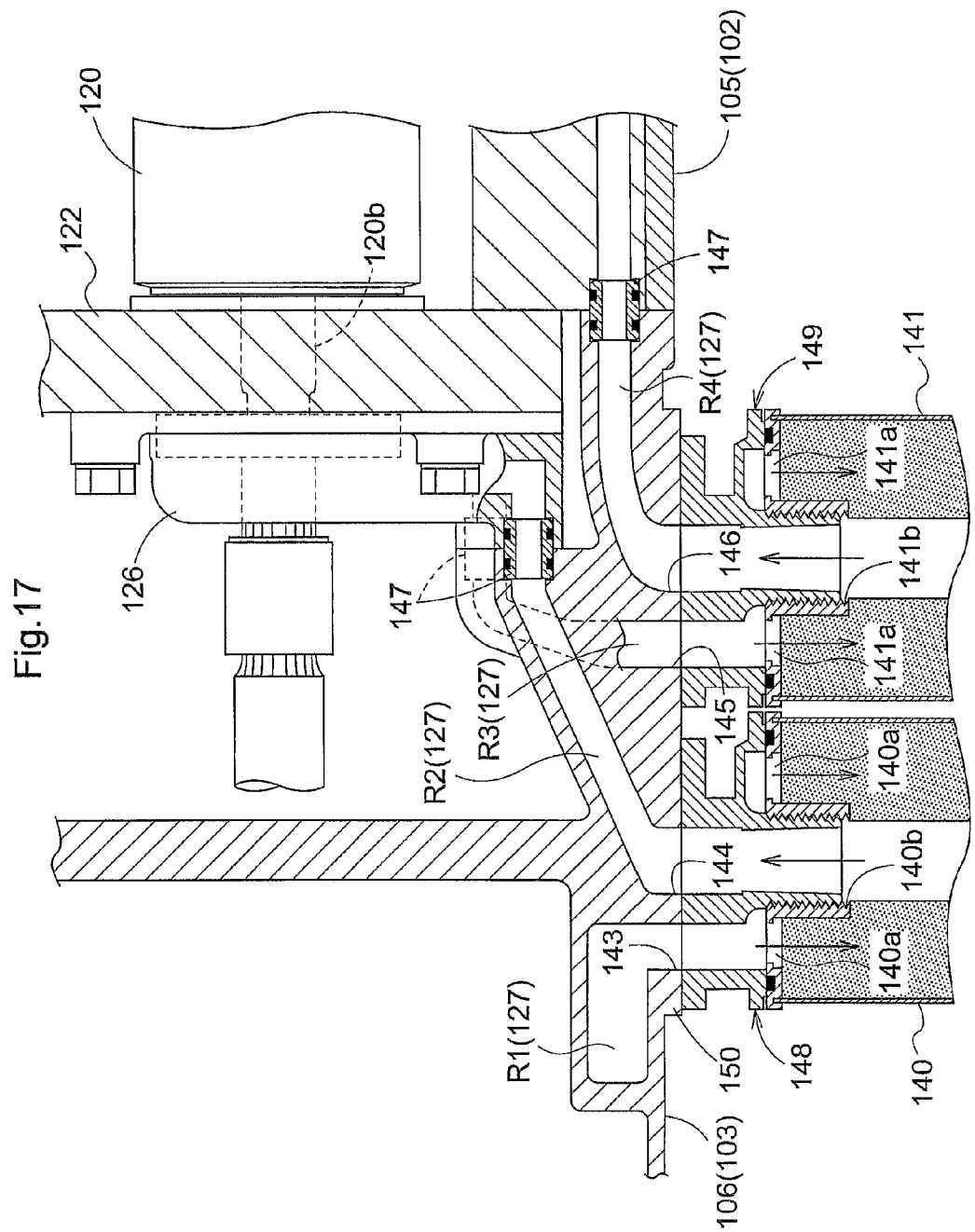

WORKING VEHICLE

BACKGROUND OF THE INVENTION

1. Technical Field

The present invention relates to a working vehicle.

2. Background Art

In a tractor as an example of a working vehicle, a boarding step (step) is ordinarily configured by a step face portion and a reinforcing portions that are formed by bending downward the front edge and the outer edges of the step face portion (see JP H8-108754A (Paragraph 0013, FIGS. 1 to 3), for example).

Furthermore, auxiliary steps positioned between the ground and the boarding step for assisting boarding and alighting from the driver's station may be linked via a pair of front and rear support members to both lateral end portions of the boarding step (driver's station floor) (see JP 2007-125931A (Paragraphs 0018 to 0023, FIGS. 1 to 4), for example).

SUMMARY OF INVENTION

Recently, in a working vehicle such as a tractor, attempts have been made to effectively use a region on the back face side of the boarding step as an accommodation space for a fuel tank, a battery, and the like. However, the above-described configuration is problematic in that the reinforcing portions that extend downward from the outer edges of the step face portion or the auxiliary steps that are linked to both lateral end portions of the boarding step obstruct attachment and detachment of a fuel tank, a battery, and the like to and from the accommodation space on the back face side of the boarding step, and maintenance of a fuel tank, a battery, and the like arranged in the accommodation space, thereby making it difficult to perform these operations.

Accordingly, there is a demand for making it easy to perform attachment and detachment of a fuel tank, a battery, and the like to and from the accommodation space formed on the back face side of the boarding step, and maintenance of a fuel tank, a battery, and the like arranged in the accommodation space.

The present invention is directed to a working vehicle, including:

a boarding step;

an accommodation space positioned on a back face side of the boarding step; and a cover member that is detachably attached to a laterally outer end portion of the boarding step, including a vertically oriented cover face that covers the accommodation space from a laterally outer side, an upper end extending portion that extends from an upper end of the cover face toward the boarding step, a front end extending portion that extends from a front end of the cover face toward the boarding step, and a rear end extending portion that extends from a rear end of the cover face toward the boarding step;

wherein the cover member has an outer edge portion configured by the upper end extending portion, the front end extending portion, and the rear end extending portion in which a front end of the upper end extending portion and an upper end of the front end extending portion are connect to each other, and a rear end of the upper end extending portion and an upper end of the rear end extending portion are connected to each other.

According to this feature of the present invention, a fuel tank, a battery, and the like arranged in the accommodation space on the back face side of the boarding step can be protected by the cover member. Furthermore, when performing attachment and detachment of a fuel tank, a battery, and the like to and from the accommodation space, or maintenance of a fuel tank, a battery, and the like arranged in the accommodation space, the cover member can be detached from the laterally outer end portion of the boarding step so that the accommodation space is exposed to the laterally outer side of the vehicle body, and, thus, attachment and detachment of a fuel tank, a battery, and the like to and from the accommodation space, and maintenance of a fuel tank, a battery, and the like arranged in the accommodation space can be easily performed from the laterally outer side of the vehicle body.

Furthermore, since the outer edge portion configured by the upper end extending portion, the front end extending portion, and the rear end extending portion is included in the cover member, the shape retaining strength of the cover member can be increased. Furthermore, when the cover member is attached to the laterally outer end portion of the boarding step, the strength at the laterally outer end portion of the boarding step can be increased.

Accordingly, usually, the cover member having a high shape retaining strength is attached to the laterally outer end portion of the boarding step so that a fuel tank, a battery, and the like arranged in the accommodation space on the back face side of the boarding step can be protected, and, at the same time, the strength of the boarding step can be made high. Furthermore, when performing attachment and detachment of a fuel tank, a battery, and the like to and from the accommodation space, or maintenance of a fuel tank, a battery, and the like arranged in the accommodation space, the cover member is detached from the laterally outer end portion of the boarding step, and, thus, the work efficiency in the attachment and detachment and the maintenance can be improved.

In the above-described configuration, it is preferable that the boarding step has reinforcing portions that extend downward from both front and rear end portions of left and right ends of a step face of the boarding step, the upper end extending portion, the front end extending portion, and the rear end extending portion respectively function as linkage portions that are linked to corresponding locations of the step face and the front and rear reinforcing portions of the boarding step.

According to this configuration, the upper end extending portion, the front end extending portion, and the rear end extending portion can be respectively linked to corresponding locations of the step face and the front and rear reinforcing portions of the boarding step. Accordingly, compared with the case in which either the upper end extending portion, the front end extending portion, or the rear end extending portion is linked to the boarding step, the cover member having a high shape retaining strength can more effectively function as a reinforcing member for increasing the strength at the laterally outer end portion of the boarding step. Accordingly, the cover member can more effectively reinforce the boarding step.

In the above-described configuration, it is preferable that the cover member is provided with an auxiliary step for boarding and alighting from the boarding step.

According to this feature of the present invention, usually, the cover member provided with the auxiliary step is attached to the laterally outer end portion of the boarding step so that the auxiliary step can be used when boarding and alighting from the boarding step. Accordingly, boarding and alighting from the boarding step can be easily performed.

Furthermore, when performing attachment and detachment of a fuel tank, a battery, and the like to and from the accommodation space, or maintenance of a fuel tank, a battery, and the like arranged in the accommodation space, the cover member is detached from the laterally outer end portion of the boarding step, and, at the same time, the auxiliary step can be also detached from the laterally outer end portion of the boarding step. Accordingly, the accommodation space can be exposed to the laterally outer side of the vehicle body.

That is to say, the efficiency in attachment and detachment of the cover member and the auxiliary step can be improved compared with the case of individually attaching and detaching the cover member and the auxiliary step, and the cover member and the auxiliary step can be prevented from obstructing attachment and detachment of a fuel tank, a battery, and the like to and from the accommodation space, or maintenance of a fuel tank, a battery, and the like arranged in the accommodation space.

Accordingly, boarding and alighting from the boarding step can be more easily performed without lowering the attachment and detachment efficiency of a fuel tank, a battery, and the like to and from the accommodation space on the back face side of the boarding step or the maintenance efficiency of a fuel tank, a battery, and the like arranged in the accommodation space.

In the above-described configuration, it is preferable that the cover face has an opening through which an arm portion extending upward from a step portion of the auxiliary step is allowed to be inserted, an extending end of the arm portion inserted through the opening is welded to the upper end extending portion, and a portion of the arm portion inserted through the opening, adjacent to a peripheral edge portion of the opening, is welded to the peripheral edge portion.

According to this feature of the present invention, the auxiliary step can be firmly welded to the cover member, and, thus, the auxiliary step can function as a reinforcing member for increasing the shape retaining strength of the cover member. Furthermore, when the cover member having an increased shape retaining strength in this manner is attached to the laterally outer end portion of the boarding step, the strength at the laterally outer end portion of the boarding step can be further increased. Accordingly, boarding and alighting from the boarding step can be more easily performed, and, at the same time, the strength of the cover member and the boarding step can be improved.

Moreover, the present invention is directed to a working vehicle, including:
 a transmission case (hereinafter, abbreviated as a T/M case);
 a hydrostatic continuously variable transmission;
 a transmission casing that accommodates the hydrostatic continuously variable transmission;
 a port block that is linked to an end portion of the transmission casing on a side on which the T/M case is positioned;
 a charge oil supply passage that is provided through the transmission casing, the port block, and the T/M case, and that supplies charge oil to the hydrostatic continuously variable transmission;
 a main filter;
 a charge pump; and
 an HST filter;
 wherein the main filter, the charge pump, and the HST filter are arranged on the charge oil supply passage in this order from an upstream side in a charge oil flow direction,
 in one of the lateral side portions of the T/M case, a main installation location for installation of the main filter and an HST installation location for installation of the HST filter are arranged adjacent to each other,
 the main installation location is provided with a main supply opening that allows oil to be supplied from the T/M case to the main filter, and a main receiving opening that allows oil discharged from the main filter to be received by the T/M case, and
 the HST installation location is provided with an HST supply opening that allows oil to be supplied from the T/M case to the HST filter, and an HST receiving opening that allows oil discharged from the HST filter to be received by the T/M case.

According to this configuration, the main installation location and the HST installation location are arranged in one of the lateral side portions of the T/M case, and are arranged adjacent to each other in said one lateral side portion of the T/M case, and, thus, the main filter and the HST filter can be installed in a concentrated manner in one of the lateral side portions of the T/M case, and the installation space of the main filter and the HST filter can be minimized. Accordingly, the size of the T/M case in the lateral width direction can be reduced, and, furthermore, the installation space of the main filter and the HST filter can be reduced. Furthermore, in order to install the main filter, it is sufficient that the main filter is installed such that oil supplied from the main supply opening is sucked and is discharged to the main receiving opening, and, thus, the main filter can be easily installed in an oil-tight manner. Also, as in the case of the main filter, in order to install the HST filter, it is sufficient that the HST filter is installed such that oil supplied from the HST supply opening is sucked and is discharged to the HST receiving opening.

In the above-described configuration, it is preferable that the charge pump is disposed on an end portion of the port block on a side on which the T/M case is positioned, the charge oil supply passage has a charge pump supply section that extends from the main receiving opening to the charge pump and that is formed so as to be bent to change a flow direction of oil, the charge oil supply passage further has a charge pump discharge section that extends from charge pump to the HST supply opening and that is formed so as to be bent to change a flow direction of oil, and the charge pump supply section and the charge pump discharge section are configured as an internal channel formed inside a wall of the T/M case.

The flow direction of oil received from the main receiving opening may be different from the direction of oil flowing into the charge pump, or the direction of oil ejected from the charge pump may be different from the flow direction of oil flowing toward the HST supply opening. In this case, for example, if the charge oil supply passage is configured as a cylindrical member such as a pipe, the cylindrical member has to be bent to form the channel. Accordingly, there is a limitation in the bending angle of the cylindrical member, which leads to problems such as the degree of freedom in the arrangement position of the channel being lowered or the cylindrical member being easily damaged. On the other hand, according to the above-described feature, the charge pump supply section and the charge pump discharge section formed so as to be bent are configured as an internal channel that is formed inside a wall of the T/M case, and, thus, the above-mentioned problems are solved.

In the above-described configuration, it is preferable that the main filter is configured to be attachable at an inclined posture in which a tip of the main filter is positioned lower than a base thereof on the main installation location, and the HST filter is configured to be attachable at an inclined posture in which a tip of the HST filter is positioned lower than a base thereof on the HST installation location.

According to the above-described feature, the main filter and the HST filter are attached at an inclined posture, and, thus, the installation space in the T/M case in the lateral width direction can be reduced, and the suction openings of both filters can be positioned lower than the oil surface, so that entrapment of air in both the filters can be suppressed. Moreover, when replacing the filters due to maintenance or the like, these filters can be detached in a direction obliquely downward from the installation location, and the filters can be attached in a direction obliquely upward from the ground or the like toward the installation location. Accordingly, both filters can be detached and attached while suppressing interference with other members, that is, both filters can be properly arranged in a limited space, and can be easily replaced.

BRIEF DESCRIPTION OF DRAWINGS

FIG. 2 is a plan view of the tractor.
FIG. 5 is a vertical cross-sectional rear view of the main portion showing the attachment structure for the cover members and the like.
FIG. 6 is a vertical cross-sectional right side view of the main portion showing the attachment structure for the cover member (the right cover member) and the like.
FIG. 7 is a vertical cross-sectional front view of the main portion showing the attachment structure for the cover member (the right cover member) and the like.
FIG. 16 is a vertical cross-sectional rear view of the main portion of the tractor.
FIG. 17 is a view showing the main portion of a hydraulic circuit in the hydrostatic continuously variable transmission.

DESCRIPTION OF EMBODIMENTS

First Embodiment

Hereinafter, as an exemplary embodiment of the present invention, an embodiment in which the vehicle body structure of a working vehicle according to the present invention is applied to a tractor as an exemplary working vehicle will be described with reference to the drawings.

Figure 1:
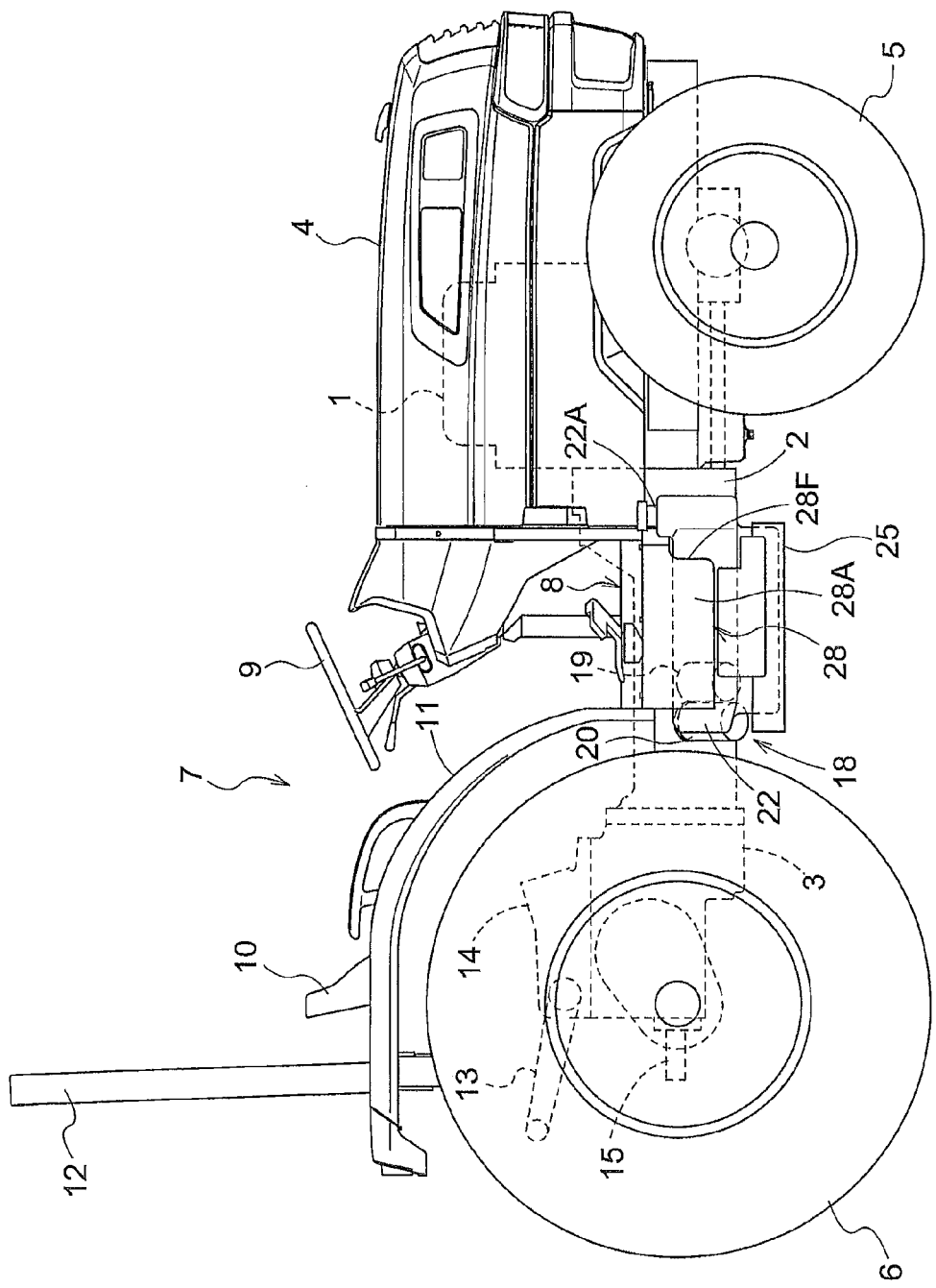
FIG. 1 is an overall side view of a tractor.

As shown in FIGS. 1 and 2, in a tractor given as an example of this embodiment, a clutch housing 2 is linked to a rear portion of an engine 1 mounted in the front portion of the tractor, and a transmission case (hereinafter, abbreviated as a T/M case) 3 also functioning as a frame is linked to the clutch housing 2 so as to extend from the rear portion of the clutch housing 2 to the vehicle body rear portion. Furthermore, a pair of left and right front wheels 5 are steerably and drivably arranged on both the left and right sides of an engine hood 4 that covers the engine 1 and the like from above, and a pair of left and right rear wheels 6 are drivably and brakably arranged on both the left and right sides of the rear portion of the T/M case 3, so that the tractor is configured as of a four-wheel drive type.

A driver's boarding station 7 is formed above the T/M case 3. The driver's boarding station 7 is provided with a boarding step 8 made of metal plate that covers the front portion of the T/M case 3 and the like from above, a steering wheel 9 for steering the front wheels, a driver's seat 10, and the like. A pair of left and right rear fenders 11 that cover the upper portions of the rear wheels 6 from the driver's boarding station side are arranged on both the left and right sides of the driver's seat 10. A protective frame 12 formed in an inverted U shape when viewed in the front-rear direction is provided upright behind the driver's seat 10.

The rear portion of the T/M case 3 is provided with a pair of left and right lift arms 13 that can vertically move a working apparatus (not shown) such as a rotary tiller or a plow linked to the rear portion of the tractor, and a hydraulic lift cylinder 14 that drives to vertically swing the left and right lift arms 13, a PTO shaft 15 that can take off operational motive power when a drive-type working apparatus such as a rotary tiller is linked to the rear portion of the tractor, and the like.

As shown in FIGS. 1 to 5, the boarding step 8 includes a step face 8A formed into a shape in which both left and right end portions of its front portion are positioned in front of the left and right rear fenders 11 and its rear portion is positioned between the left and right rear fenders 11. Furthermore, a left-right intermediate portion 8Aa of the step face 8A opposing the T/M case 3 is bent so as to bulge upward, and, thus, the shape retaining strength at the left-right intermediate portion 8Aa is improved. Furthermore, a plurality of reinforcing members 16 made of channel steel material or the like are welded to left and right laterally outer portions that are spaced apart by a predetermined distance in the left-right direction from the left-right intermediate portion 8Aa, and, thus, the left and right laterally outer portions are reinforced. Furthermore, the configuration is such that the reinforced left and right laterally outer portions are received and supported from below by left and right support members 17 that extend from the T/M case 3.

As shown in FIGS. 3A to 7, the front end of the boarding step 8 is bent downward throughout regions from locations adjacent to the engine hood 4 to laterally outer ends of the boarding step 8, and, thus, a pair of left and right front reinforcing portions 8B that reinforce both left and right ends of the front portion of the boarding step 8 are formed. The rear portion of the boarding step 8 is bent downward at locations in which it opposes the left and right rear fenders 11, and, thus, a plurality of rear reinforcing portions 8C that reinforce both left and right ends of the rear portion of the boarding step 8 are formed.

A region close to the back face of the boarding step 8 on the back face side is divided by the T/M case 3 into left and right accommodation spaces 18. The accommodation spaces 18 accommodate two oil filters 19 and 20 that are detachably attached to the right side face of the T/M case 3, two fuel tanks 21 and 22 that are blow-molded products made of resin for storing fuel that is supplied to the engine 1, and the like.

As shown in FIGS. 3A to 5, the left and right fuel tanks 21 and 22 are dispersedly arranged on the left and right of the T/M case 3. Furthermore, the left and right fuel tanks 21 and 22 are curved along the rear fenders 11 at locations in which they oppose the rear fenders 11. The right front end of the right fuel tank 22 is unitarily provided with a cylinder-like fuel supply portion 22A that can supply fuel from the right front. The left and right fuel tanks 21 and 22 are provided with an interconnection tube 23 including a check valve (not shown) that allows fuel to flow from the right fuel tank 22 to the left fuel tank 21 and that prohibits fuel from flowing from the left fuel tank 21 to the right fuel tank 22, the interconnection tube 23 being provided so as to connect the left and right fuel tanks 21 and 22.

Figure 3A:
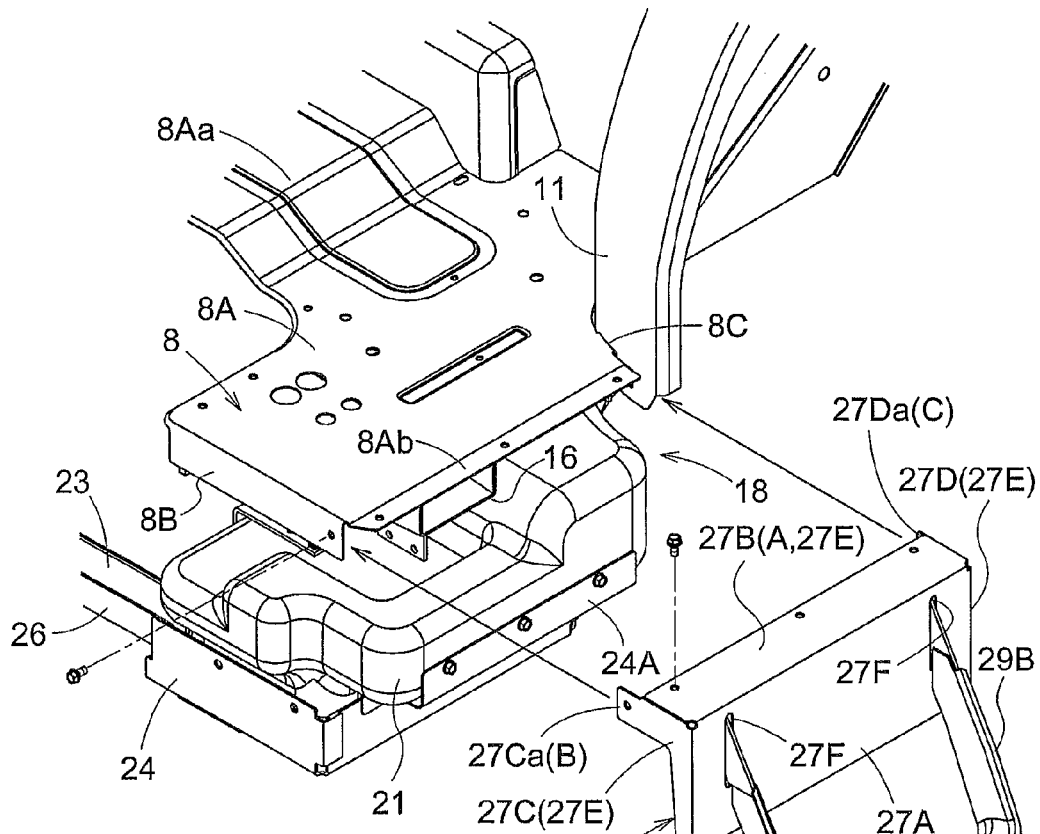
FIG. 3A is a perspective view of the main portion showing a state in which a left cover member has been detached.
Figure 3B:
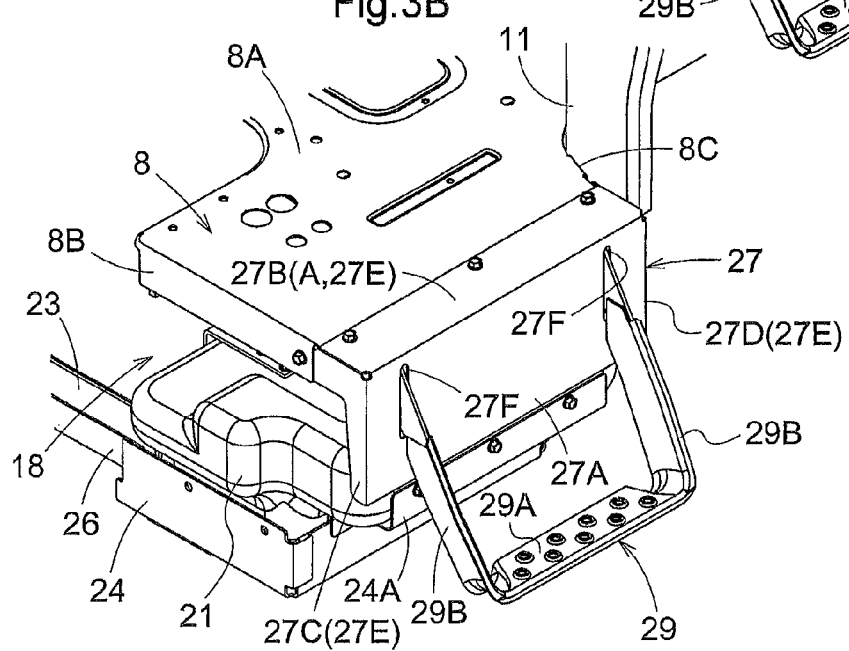
FIG. 3B is a perspective view of the main portion showing a state in which the left cover member has been attached.
Figure 5:
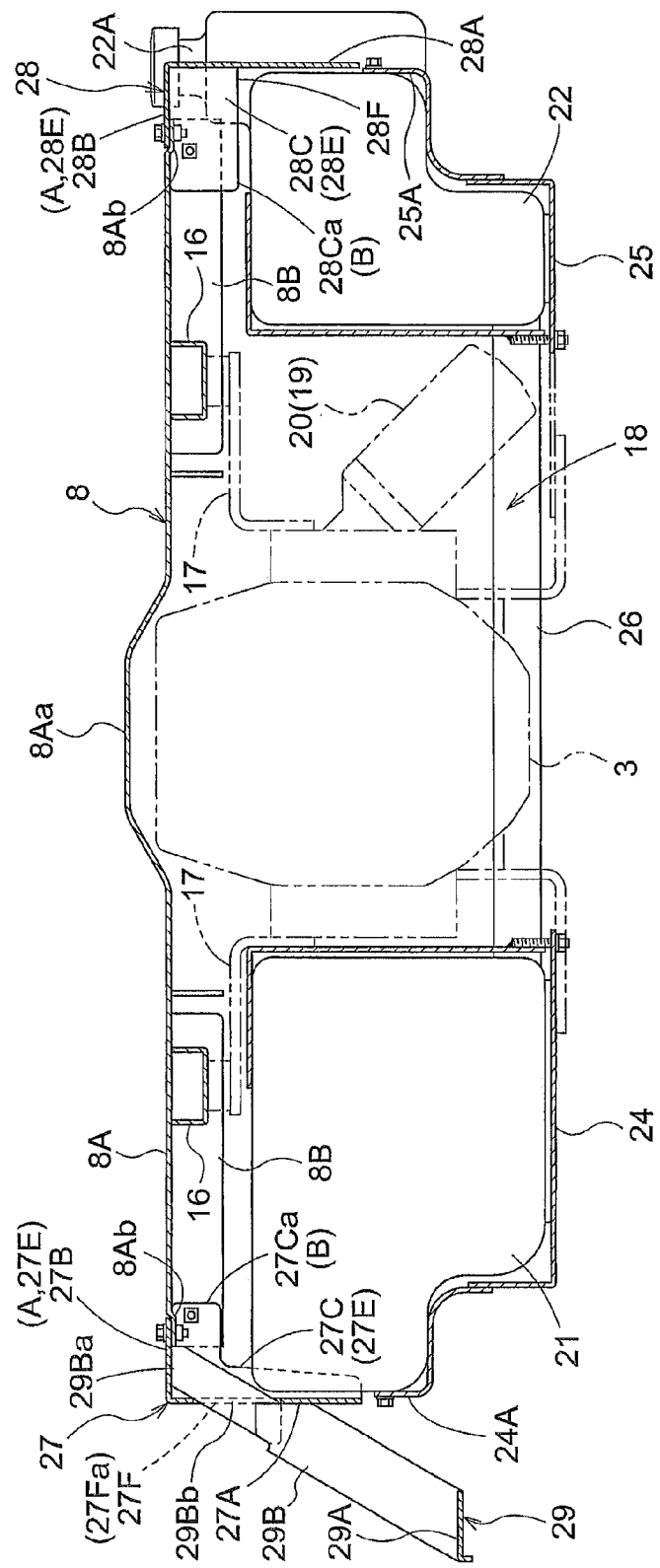
Figure 6:
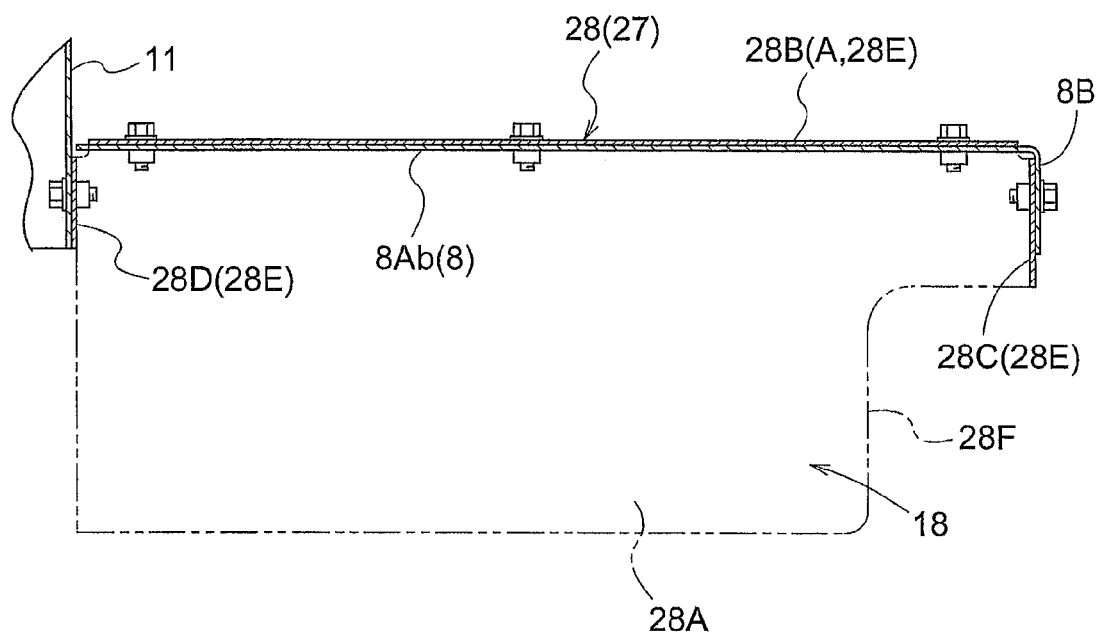
Figure 7:
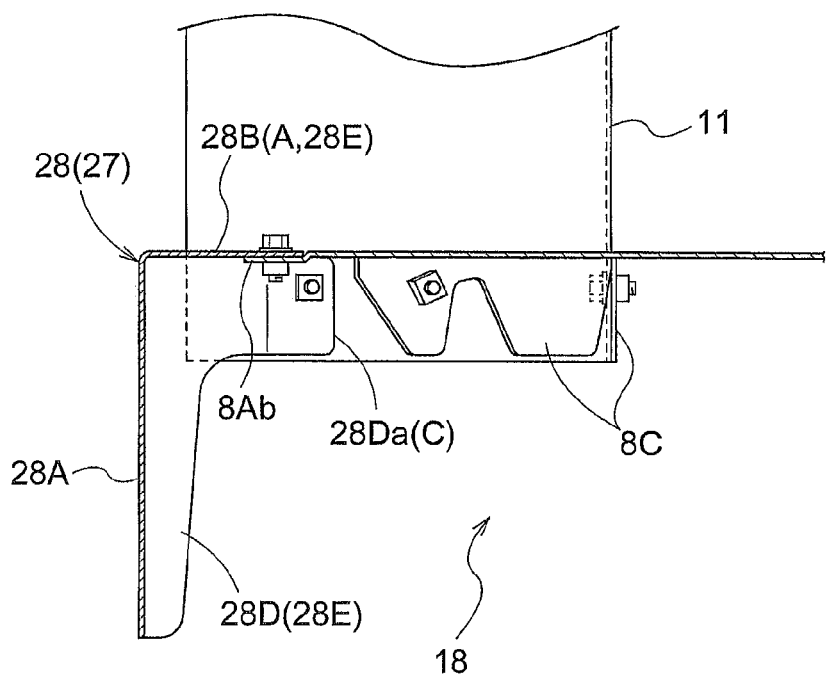
Figure 8:
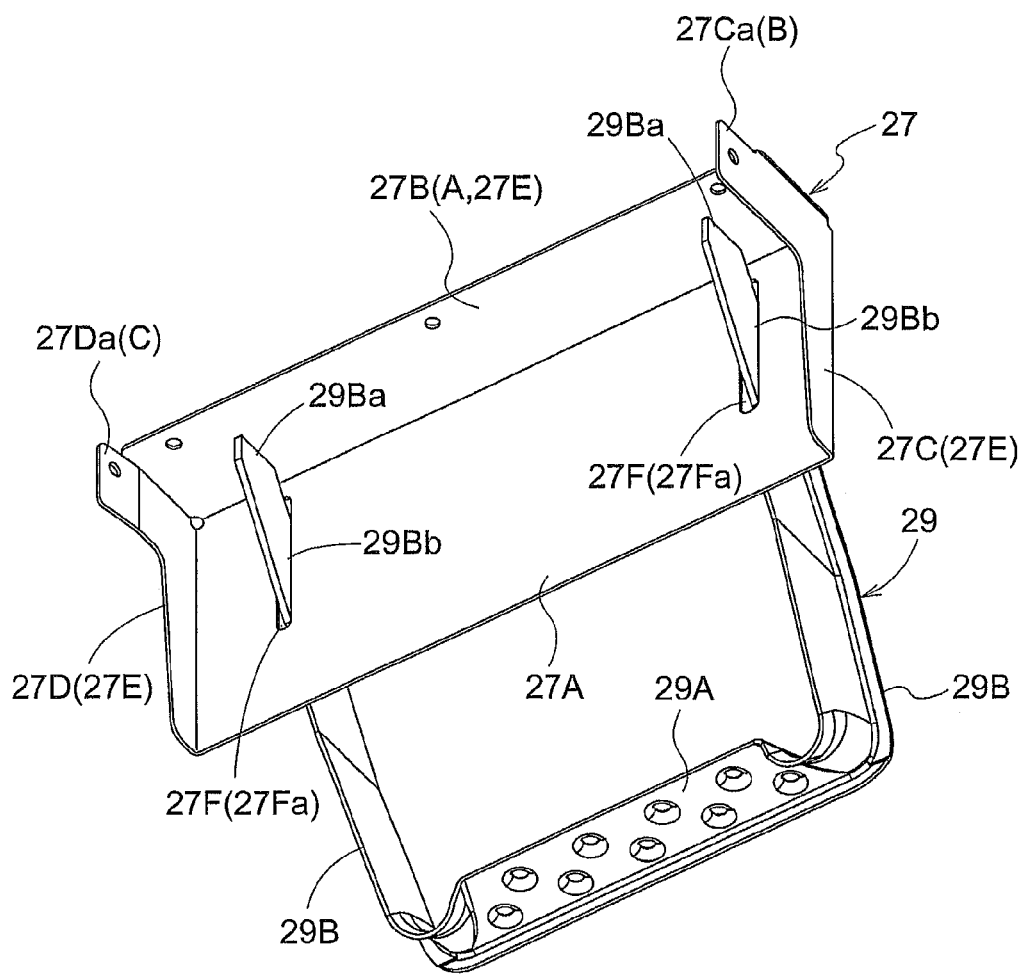
FIG. 8 is a perspective view showing the configuration of the left cover member.

As shown in FIGS. 3A, 3B, and 5, the left fuel tank 21 is detachably linked to the T/M case 3, for example, via a left support frame 24 that supports the left fuel tank 21 so as to cover the tank from below A left end portion 24A of the left support frame 24 is bent upward in the shape of a crank when viewed in the front-rear direction along the left end portion of the left fuel tank 21, and, thus, the left end portion 24A is configured so as to function as a protective cover that covers and protects the lower side of the left end portion of the left fuel tank 21 from the laterally outer side.

Figure 4A:
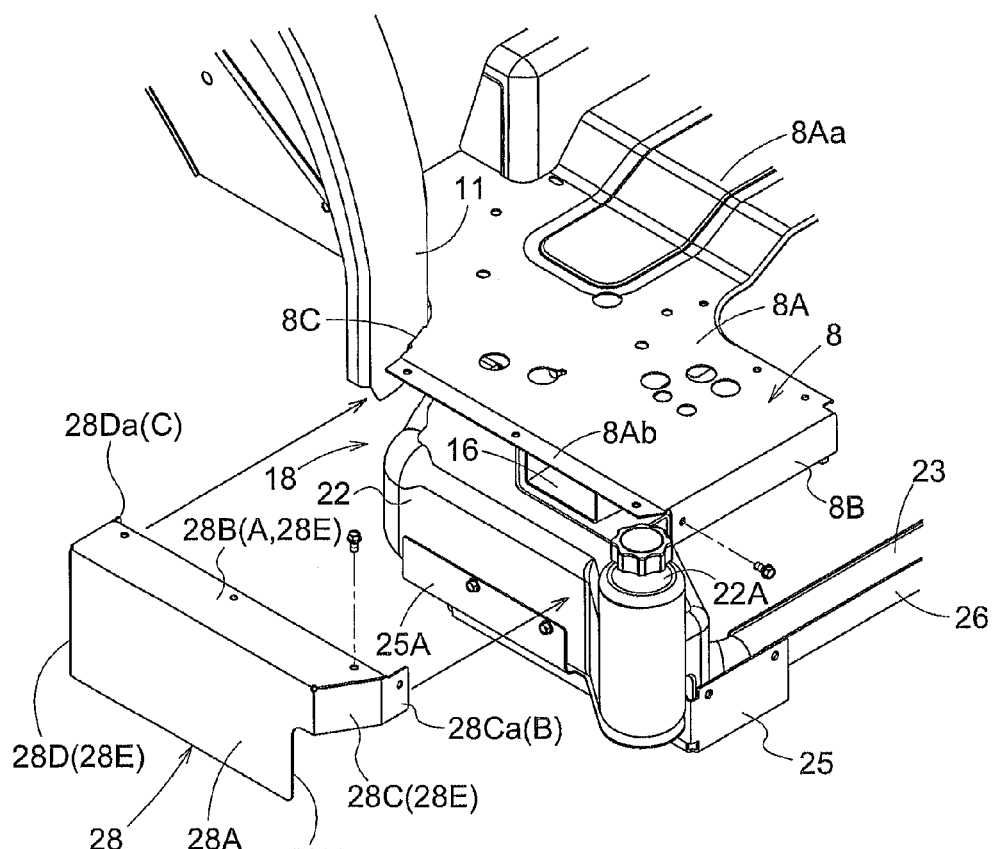
FIG. 4A is a perspective view of the main portion showing a state in which a right cover member has been detached.
Figure 4B:
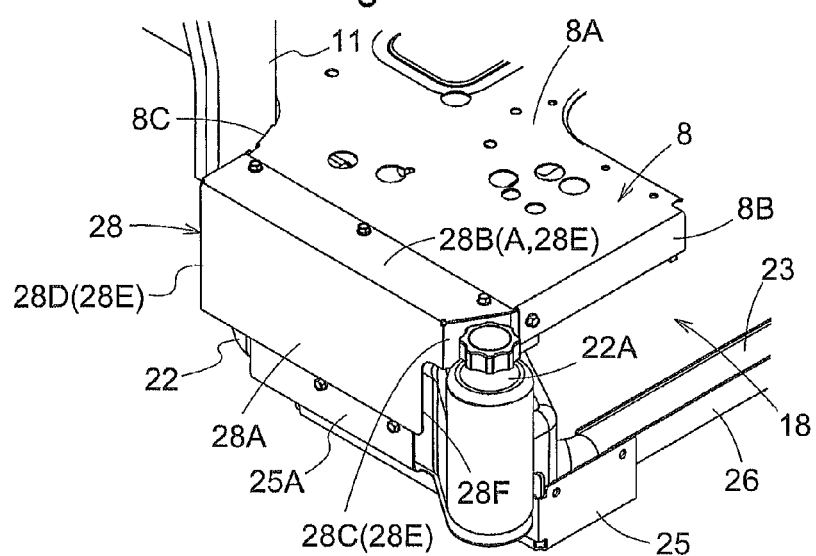
FIG. 4B is a perspective view of the main portion showing a state in which the right cover member has been attached.

As shown in FIGS. 4A to 5, the right fuel tank 22 is detachably linked to the T/M case 3, for example, via a right support frame 25 that supports the right fuel tank 22 so as to cover the tank from below A right end portion 25A of the right support frame 25 is bent upward in the shape of a crank when viewed in the front-rear direction along the right end portion of the right fuel tank 22, and, thus, the right end portion 25A is configured so as to function as a protective cover that covers and protects the lower side of the right end portion of the right fuel tank 22 from the laterally outer side.

As shown in FIGS. 3A to 5, the interconnection tube 23 is protected by being covered from below by a protective member 26 made of channel steel material extending between the left and right support frames 24 and 25.

As shown in FIGS. 3A to 8, cover members 27 and 28 including vertically oriented cover faces 27A and 28A that cover the accommodation spaces 18 from the laterally outer sides are detachably attached to the left and right outer end portions of the boarding step 8. The left and right cover members 27 and 28 respectively include upper end extending portions 27B and 28B that extend from the upper ends of the cover faces 27A and 28A toward the boarding step 8, front end extending portions 27C and 28C that extend from the front ends of the cover faces 27A and 28A toward the boarding step 8, and rear end extending portions 27D and 28D that extend from the rear ends of the cover faces 27A and 28A toward the boarding step 8. The upper end extending portions 27B and 28B respectively have front ends that are welded to the upper ends of the adjacent front end extending portions 27C and 28C and rear ends that are welded to upper ends of the adjacent rear end extending portions 27D and 28D. Accordingly, the left and right cover members 27 and 28 are respectively configured so as to have outer edge portions 27E and 28E that include the upper end extending portions 27B and 28B, the front end extending portions 27C and 28C, and the rear end extending portions 27D and 28D substantially in an inverted U shape when viewed from a side of the vehicle body.

The upper end extending portions 27B and 28B are configured as linkage portions A that can be bolted at three points each to corresponding left and right lateral end portions 8Ab of the step face 8A, which extend closer to the laterally outer sides than the front and rear reinforcing portions 8B and 8C of the boarding step 8 are, in a state in which the linkage portions A are in contact with the front faces of the corresponding lateral end portions 8Ab. The front end extending portions 27C and 28C are configured such that their extending end portions 27Ca and 28Ca, which extend closer to the boarding step than the upper end extending portions 27B and 28B are, function as linkage portions B that can be bolted at one point each to the corresponding left and right front reinforcing portions 8B of the boarding step 8 in a state in which the linkage portions B are in contact with the back faces of the corresponding front reinforcing portions 8B. The rear end extending portions 27D and 28D are configured such that their extending end portions 27Da and 28Da, which extend closer to the boarding step than the upper end extending portions 27B and 28B are, function as linkage portions C that can be bolted at one point each to the corresponding left and right rear fenders 11 in a state in which the linkage portions C are in contact with the front faces of the corresponding rear fenders 11. The left and right rear fenders 11 are configured such that they can be bolted to the corresponding left and right rear reinforcing portions 8C of the boarding step 8.

That is to say, the upper end extending portions 27B and 28B of the cover members 27 and 28 can be respectively directly bolted to the corresponding lateral end portions 8Ab of the step face 8A of the boarding step 8, the front end extending portions 27C and 28C of the cover members 27 and 28 can be respectively directly bolted to the corresponding front reinforcing portions 8B of the boarding step 8, and the rear end extending portions 27D and 28D of the cover members 27 and 28 can be respectively bolted via the rear fenders 11 to the corresponding rear reinforcing portions 8C of the boarding step 8.

With this configuration, the fuel tanks 21 and 22 and the like arranged in the accommodation spaces 18 on the back face side of the boarding step 8 can be protected by the left and right cover members 27 and 28. Furthermore, when performing attachment and detachment of the fuel tanks 21 and 22 and the like to and from the accommodation spaces 18, or maintenance of the fuel tanks 21 and 22 and the like arranged in the accommodation spaces 18, the cover members 27 and 28 can be detached from the laterally outer end portions of the boarding step 8 so that the accommodation spaces 18 are exposed to the laterally outer sides of the vehicle body, and, thus, attachment and detachment of the fuel tanks 21 and 22 and the like to and from the accommodation spaces 18, and maintenance of the fuel tanks 21 and 22 and the like arranged in the accommodation spaces 18 can be easily performed from the laterally outer sides of the vehicle body. Furthermore, since attachment and detachment of the fuel tanks 21 and 22 can be easily performed, the work efficiency in maintenance of the T/M case 3 and the like performed after detaching the fuel tanks 21 and 22 can be improved.

Furthermore, since the cover members 27 and 28 respectively have the outer edge portions 27E and 28E that include the upper end extending portions 27B and 28B, the front end extending portions 27C and 28C, and the rear end extending portions 27D and 28D substantially in an inverted U shape, the shape retaining strength of the cover members 27 and 28 can be increased. Moreover, when the upper end extending portions 27B and 28B, the front end extending portions 27C and 28C, and the rear end extending portions 27D and 28D of the cover members 27 and 28 having an increased shape retaining strength are respectively bolted to corresponding locations on the step face 8A and the front and rear reinforcing portions 8B and 8C of the boarding step 8, the strength at the laterally outer end portions of the boarding step 8 can be increased.

As shown in FIGS. 2, 3A, 3B, 5, and 8, the left cover member 27 is provided with an auxiliary step 29 for boarding and alighting from the boarding step 8. The auxiliary step 29 is made of metal plate in the shape of a U including a non-slip step portion 29A and a pair of left and right arm portions 29B that extend upward from both front and rear ends of the step portion 29A. The cover face 27A of the left cover member 27 is provided with slots 27F that function as a pair of front and rear openings 27F through which the arm portions 29B of the auxiliary step 29 can be inserted. When extending ends 29Ba of the arm portions 29B inserted through the slots 27F are welded to the upper end extending portion 27B of the cover member 27, and adjacent locations 29Bb of the arm portions 29B inserted through the slots 27F, adjacent to peripheral edge portions 27Fa of the slots 27F, are welded to the peripheral edge portions 27Fa of the slots 27F, the auxiliary step 29 is unitarily disposed on the left cover member 27.

With this configuration, usually, the left cover member 27 provided with the auxiliary step 29 is attached to the left outer end portion of the boarding step 8 so that the auxiliary step 29 can be used when boarding and alighting from the boarding step 8, and, thus, boarding and alighting from the boarding step 8 can be easily performed.

Furthermore, when performing attachment and detachment of the fuel tanks 21 and 22 and the like to and from the accommodation spaces 18, or maintenance of the fuel tanks 21 and 22 and the like arranged in the accommodation spaces 18, the left cover member 27 is detached from the left outer end portion of the boarding step 8, and, at the same time, the auxiliary step 29 can be also detached from the left outer end portion of the boarding step 8. Accordingly, the efficiency in attachment and detachment of the left cover member 27 and the auxiliary step 29 can be improved compared with the case of individually attaching and detaching the left cover member 27 and the auxiliary step 29, and the left cover member 27 and the auxiliary step 29 can be prevented from obstructing attachment and detachment of the fuel tanks 21 and 22 and the like to and from the accommodation spaces 18, or maintenance of the fuel tanks 21 and 22 and the like arranged in the accommodation spaces 18.

Furthermore, the auxiliary step 29 can function as a reinforcing member for increasing the shape retaining strength of the left cover member 27, and the strength of the auxiliary step 29 can be increased. Furthermore, when the left cover member 27 having an increased shape retaining strength in this manner is attached to the left outer end portion of the boarding step 8, the strength at the left outer end of the boarding step 8 can be further increased.

As shown in FIGS. 1, 4A, 4B, 5, and 6, the right cover member 28 is provided with a cut-out portion 28F for exposing the fuel supply portion 22A that is disposed on the right fuel tank 22, throughout the area from the front end extending portion 28C to the cover face 28A. Accordingly, the fuel supply portion 22A can be exposed near the boarding step 8, in front of the right cover member 28 so as not to obstruct the movement on the boarding step. When a portable auxiliary tank (not shown) for supplying fuel is used to supply fuel via the fuel supply portion 22A to the fuel tanks 21 and 22, the boarding step 8 can be used as a space for placing the auxiliary tank, and, thus, the fuel supply can be more easily performed.

As shown in FIGS. 3A, 3B, 5, and 8, the left cover member 27 is formed such that the lower end of the left cover member 27 is located close to the left end portion 24A of the left support frame 24, by applying the configuration in which the length (upper-lower length) of each of the cover face 27A, the front end extending portion 27C, and the rear end extending portion 27D extending from the upper end extending portion 27B to the lower side is longer than the length (left-right width) of the upper end extending portion 27B extending from the cover face 27A to the boarding step 8. Accordingly, the left end portion of the left fuel tank 21 facing the laterally outer side can be more reliably covered and protected from the laterally outer side by the left cover member 27 and the left end portion 24A of the left support frame 24.

As shown in FIGS. 4A to 7, the right cover member 28 is formed such that the lower end of the right cover member 28 is located close to the right end portion 25A of the right support frame 25, by applying the configuration in which the length (upper-lower length) of each of the cover face 28A, the front end extending portion 28C, and the rear end extending portion 28D extending from the upper end extending portion 28B to the lower side is longer than the length (left-right width) of the upper end extending portion 28B extending from the cover face 28A to the boarding step 8. Accordingly, the right end portion of the right fuel tank 22 facing the laterally outer side can be more reliably covered and protected from the laterally outer side by the right cover member 28 and the right end portion 25A of the right support frame 25.

As shown in FIGS. 3A to 5 and 7, the step face 8A of the boarding step 8 is formed such that the left and right lateral end portions 8Ab are located lower than the other portions by the plate thickness of each of the cover members 27 and 28. Accordingly, when the corresponding cover members 27 and 28 are attached to the left and right outer end portions of the boarding step 8, the step face 8A of the boarding step 8 and the upper end extending portions 27B and 28B of the cover members 27 and 28 can have the same surface height.

Other Embodiments

[1] The working vehicle also may be of a hybrid type in which both the engine 1 and a motor generator are mounted.

[2] The boarding step 8 may not be provided with the front and rear reinforcing portions 8B and 8C, or may be provided with linkage portions A to C only for being linked to the cover members 27 and 28.

[3] The boarding step 8 may have only one of the two laterally outer end portions facing outside the vehicle. In this case, as the cover member 27 or 28, a single detachable cover member may be disposed at said laterally outer end portion.

[4] The boarding step 8 may be a blow-molded product made of resin or the like. In this case, the boarding step 8 may be provided with an insert nut for bolting.

[5] The accommodation spaces 18 may not be left and right spaces divided by the T/M case 3. Furthermore, the accommodation spaces 18 may accommodate, for example, batteries, electric wire harnesses, and mufflers (DPF muffler), as well as hydraulic devices such as auxiliary control valves, hydraulic ducts, and fuel ducts additionally provided for driving an optionally arranged working apparatus (e.g., a front loader) or the like, a motor generator for the working vehicle of a hybrid type.

[6] The left and right cover members 27 and 28 may be configured such that the left cover member 27 is provided with the cut-out portion for exposing the fuel supply portion, and the right cover member 28 is provided with the auxiliary step 29 for boarding and alighting. Furthermore, both the left and right cover members 27 and 28 may be configured so as to be provided with the auxiliary step 29 for boarding and alighting, both the left and right cover members 27 and 28 may be configured so as not to be provided with the cut-out portion for exposing the fuel supply portion.

[7] The cover members 27 and 28 may be configured so as to be linked to the laterally outer end portions of the boarding step 8 through external fitting or internal fitting thereto.

[8] The cover members 27 and 28 may be configured such that the upper end extending portions 27B and 28B, the front end extending portions 27C and 28C, and the rear end extending portions 27D and 28D are respectively engaged with corresponding locations on the step face 8A and the front and rear reinforcing portions 8B and 8C of the boarding step 8. Furthermore, these extending portions may be configured so as to be linked to the laterally outer end portions of the boarding step 8 through a combination of engagement therewith and bolting thereto.

[9] The cover members 27 and 28 may be configured such that the rear end extending portions 27D and 28D (the linkage portions C), the rear reinforcing portions 8C of the boarding step 8, and the rear fenders 11 are bolted in a state in which the rear reinforcing portions 8C of the boarding step 8 are held between the rear end extending portions 27D and 28D (the linkage portions C) and the rear fenders 11 or in which the rear end extending portions 27D and 28D (the linkage portions C) are held between the rear reinforcing portions 8C of the boarding step 8 and the rear fenders 11.

[10] The auxiliary step 29 may be formed, for example, in an inverted T shape in which a single arm portion 29B made of steel pipe material extends upward from the middle in the front-rear direction of the step portion 29A.

[11] The shape of the openings 27F formed through the cover face 27A of the cover member 27 may be variously changed according to the cross-sectional shape of the arm portions 29B of the auxiliary step 29.

[12] The auxiliary step 29 may be unitarily disposed on the cover member 27 by, in a state in which the arm portions 29B of the auxiliary step 29 are located along the back face of the cover face 27A of the cover member 27, welding the extending ends of the arm portions 29B to the upper end extending portion 27B of the cover member 27 and further welding portions of arm portions 29B adjacent to the back face of the cover face 27A to the back face of the cover face 27A.

[13] The auxiliary step 29 may be configured so as to be detachably bolted to the cover member 27.

[14] The cover members 27 and 28 may be configured so as to be usable as support members, for example, for an auxiliary control valve for driving an optionally arranged front loader.

Note that the above-described vehicle body structure of the working vehicle may be applied to working vehicles such as a tractor, a riding-type rice transplanting machine, or a combine in which an accommodation space is formed on the back face side of a boarding step.

Second Embodiment

Hereinafter, an embodiment in which a structure for supplying charge oil to a hydrostatic continuously variable transmission according to the present invention is applied to a tractor as an exemplary working vehicle will be described with reference to the drawings.

Figure 9:
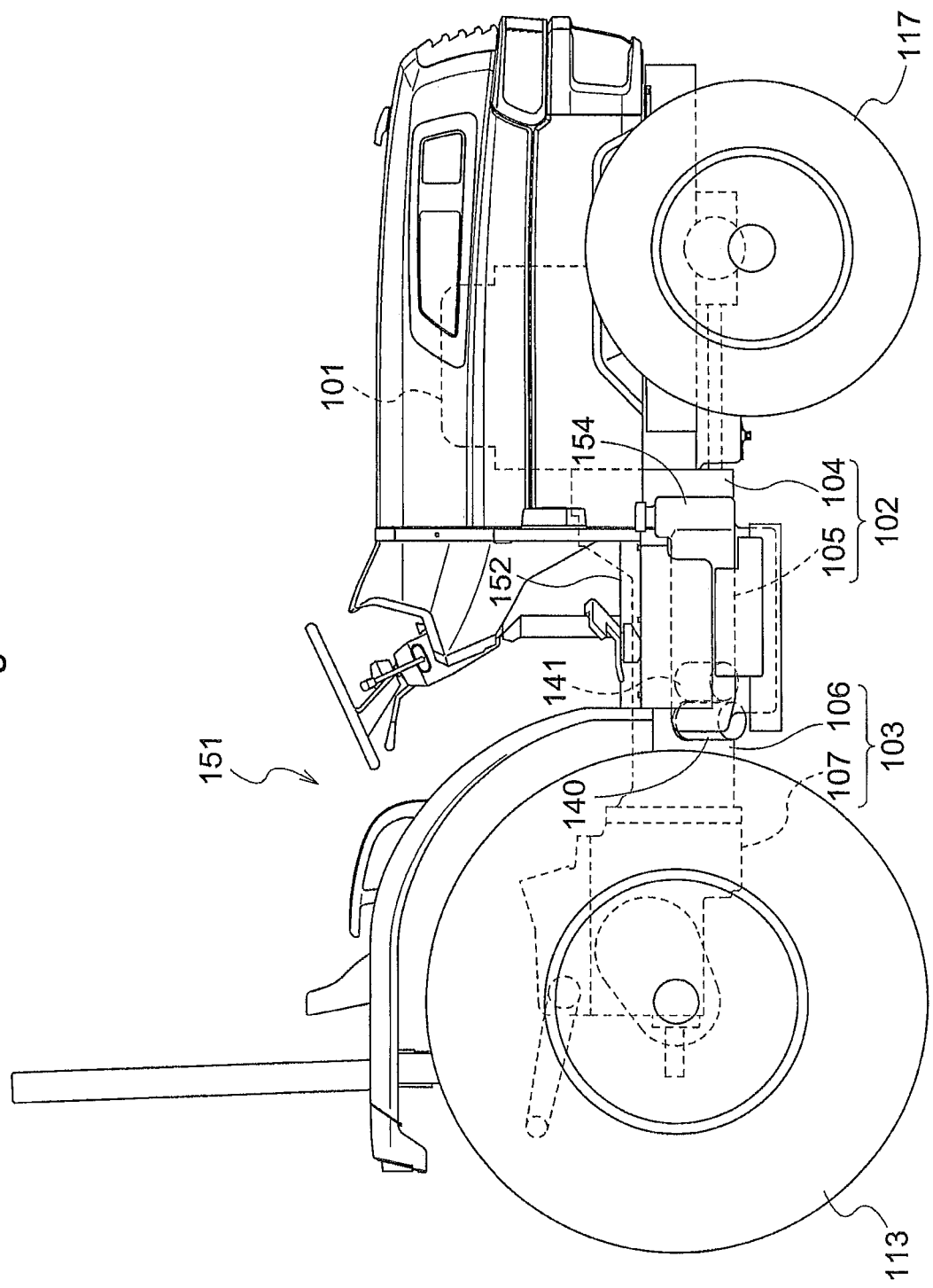
FIG. 9 is an overall side view of a tractor.
Figure 10:
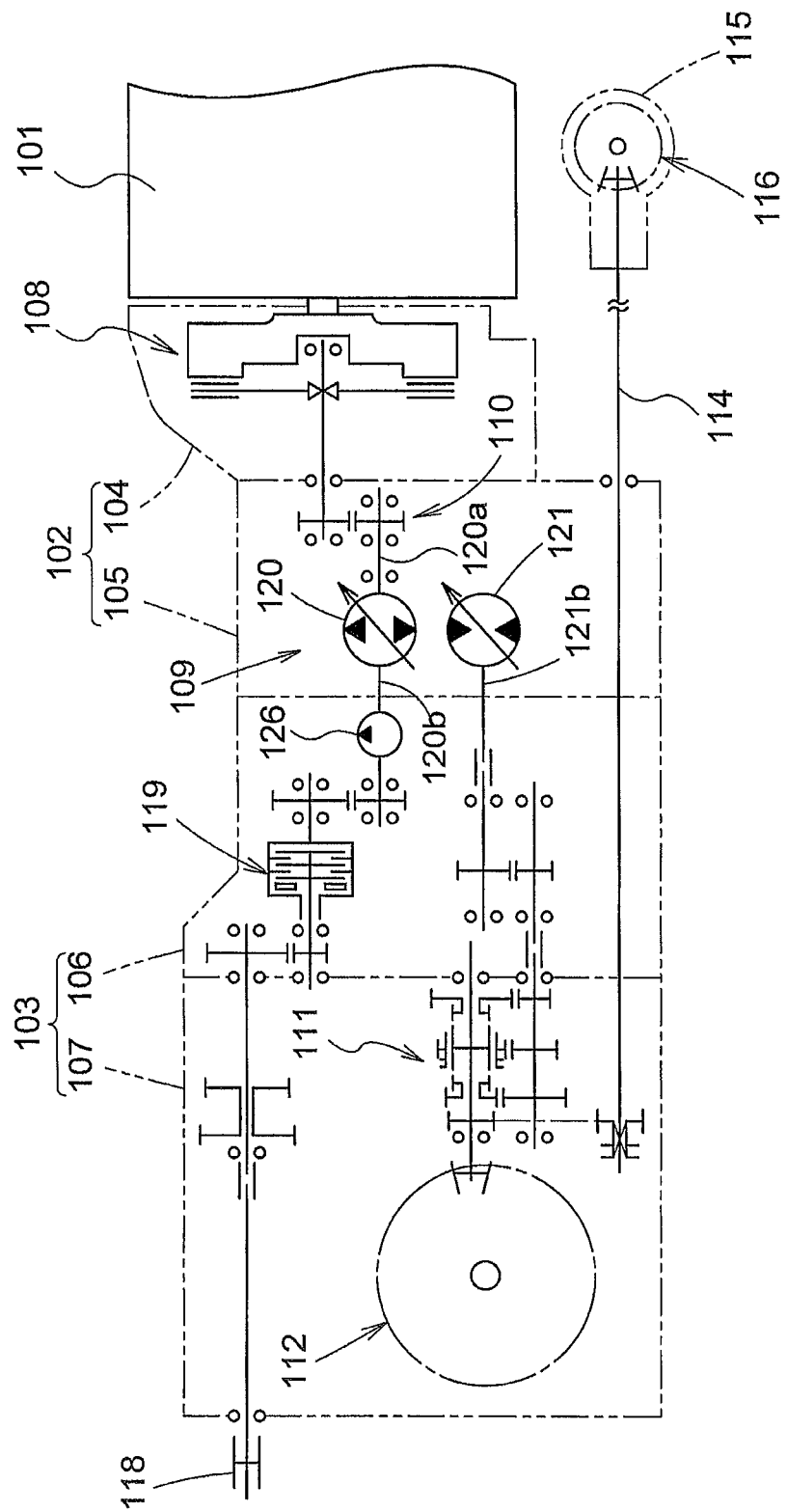
FIG. 10 is a diagram showing a transmission system of the tractor.
Figure 11:
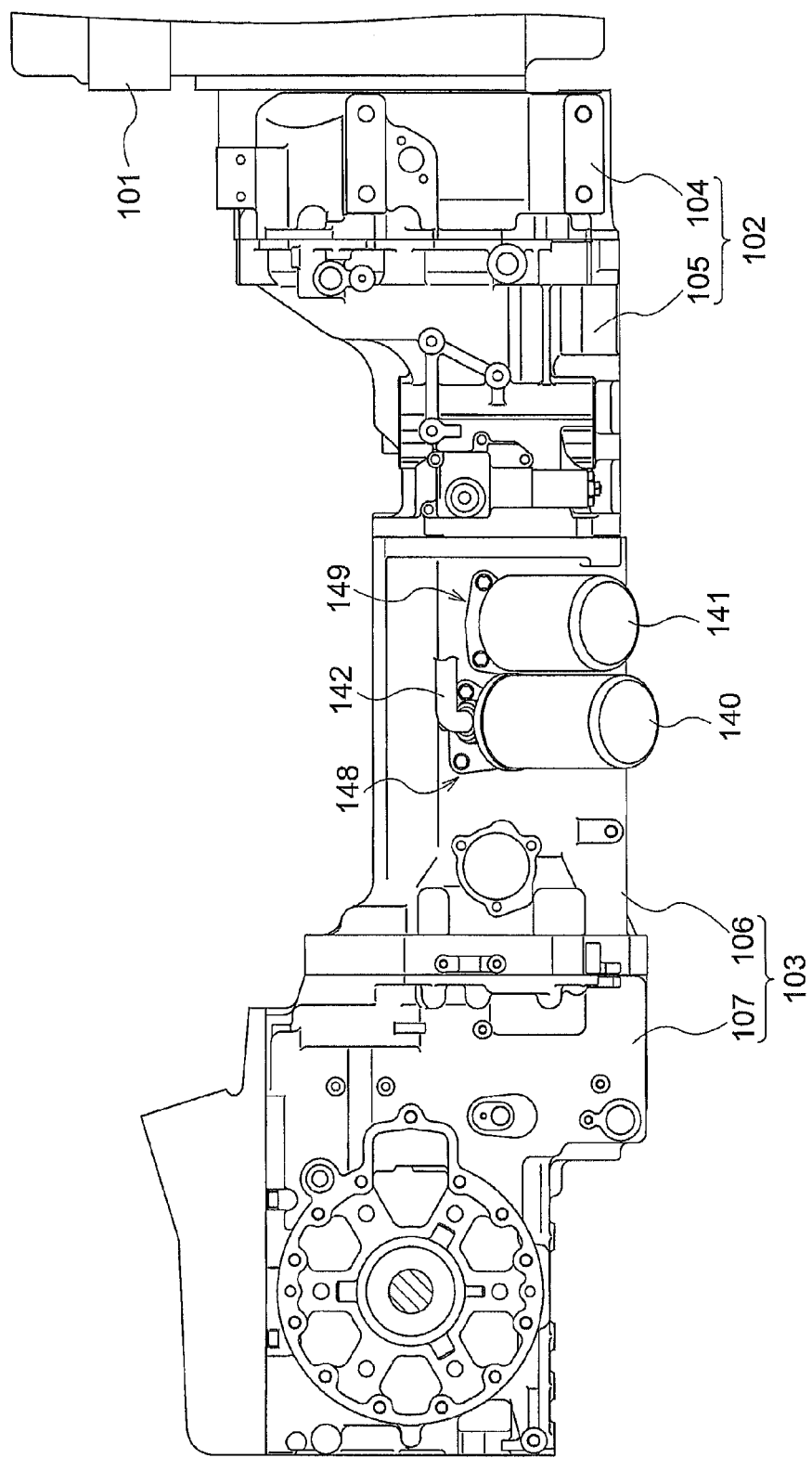
FIG. 11 is a side view of the main portion of a traveling vehicle body.

As shown in FIG. 9, a traveling vehicle body of the tractor is configured by linking an engine 101, a clutch housing 102, and a transmission case (hereinafter, abbreviated as a T/M case) 103 sequentially from the front side of the vehicle body. As shown in FIGS. 9 to 11, the clutch housing 102 is configured by a front housing 104 that is linked to the engine 101 and a transmission casing 105 that is linked to the rear end of the front housing 104. The T/M case 103 is configured by a mid case 106 that is linked to the clutch housing 102 and a rear case 107 that is linked to the rear end of the mid case 106. FIG. 9 is a side view of the tractor, FIG. 10 is a schematic diagram of the transmission system, and FIG. 11 is a side view of the main portion of the traveling vehicle body.

Hereinafter, the transmission system of the tractor will be described.

As shown in FIG. 10, the front housing 104 of the clutch housing 102 includes a dry-type main clutch 108, and the transmission casing 105 of the clutch housing 102 includes a hydrostatic continuously variable transmission 109 as a main transmission. The power from the engine 101 is conveyed via the main clutch 108 and a gear transmission portion 110 to an input shaft (pump shaft) 120a of the hydrostatic continuously variable transmission 109. The motive power after the speed change taken off from an output shaft (motor shaft) 121b of the hydrostatic continuously variable transmission 109 is conveyed to the T/M case 103 and is changed in speed by shifting a gear between three stages by a sub transmission 111, and the motive power after the final speed change is conveyed via a rear differential device 112 to left and right rear wheels 113. Furthermore, part of the motive power after the final speed change is taken off and is conveyed via a transmission shaft 114 to a front differential device 116 of a front axle case 115, thereby driving front wheels 117 that are steerably arranged on the left and right of the front axle case 115. That is, the tractor is configured so as to have a travel transmission system of a four-wheel drive type. Part of the motive power conveyed to the input shaft 120a is conveyed in a branching manner via a multi-plate PTO clutch 119 to a PTO shaft 118 that is disposed at the rear end of the T/M case 103.

The hydrostatic continuously variable transmission 109 includes an axial plunger-type variable displacement pump 120 and variable displacement motor 121, and is configured such that, when the power from the engine 101 is input to the input shaft 120a of the variable displacement pump 120, operational motive power is taken off from an output shaft 120b of the variable displacement pump 120, and traveling motive power is taken off from the output shaft 121b of the variable displacement motor 121.

Figure 12:
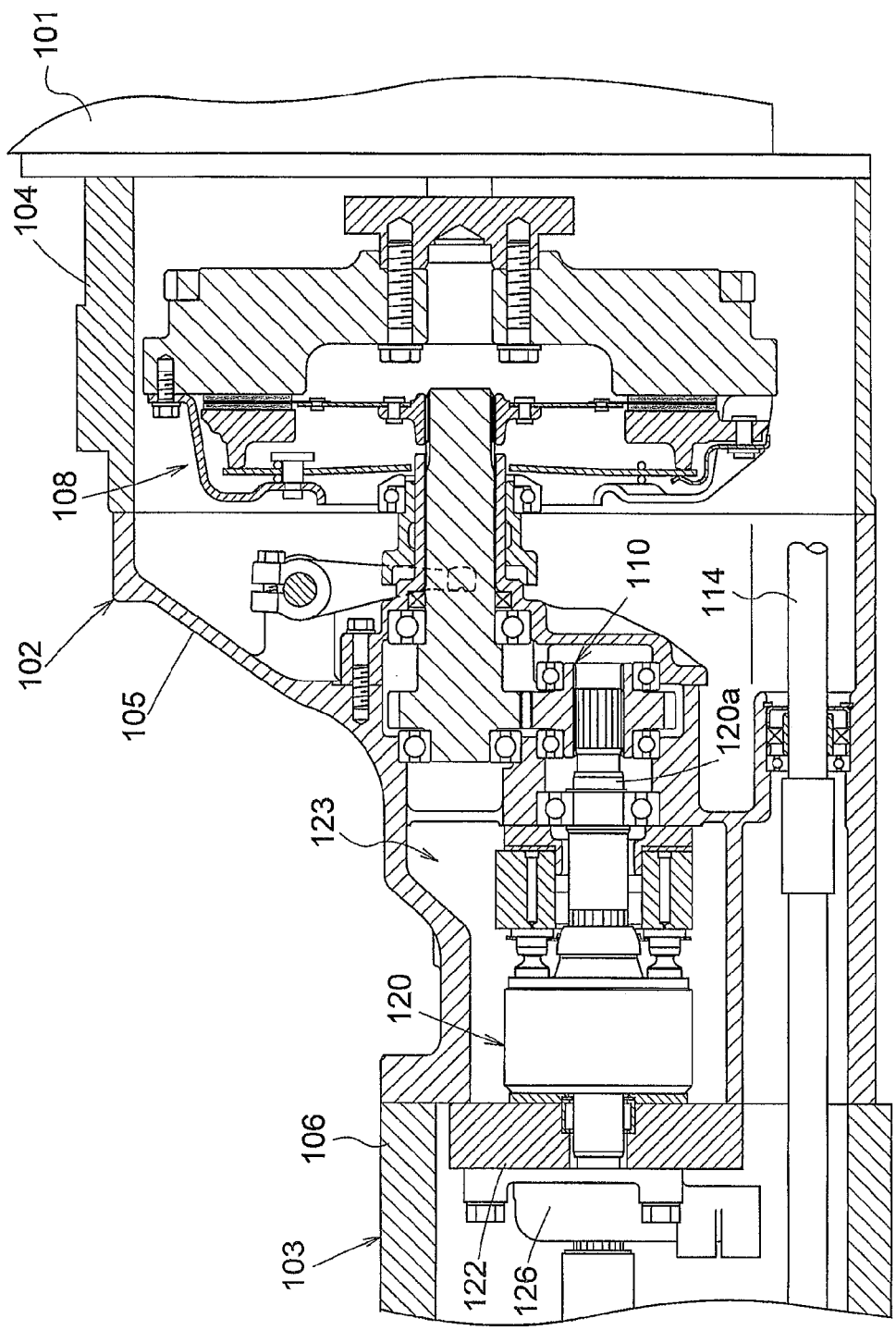
FIG. 12 is a cross-sectional view of part of the transmission system of the tractor.

FIG. 12 is a cross-sectional view showing part of the transmission system. A port block 122 is linked to the rear end face of the transmission casing 105 so as to be positioned more inward than the portion of the transmission casing 105 joined to the T/M case 103 is. Accordingly, an oil-tight transmission processing chamber 123 is formed inside the transmission casing 105, and the variable displacement pump 120 and the variable displacement motor 121 are accommodated in the transmission processing chamber 123. In this manner, the hydrostatic continuously variable transmission 109 is accommodated in the transmission casing 105.

Hereinafter, the hydraulic circuit of the hydrostatic continuously variable transmission 109 will be described with reference to FIG. 13.

The variable displacement pump 120 and the variable displacement motor 121 are connected to each other via a first oil passage 124 and a second oil passage 125 so as to form a closed circuit P. The closed circuit P includes safety valves 136 that, when the oil passage pressure of an oil passage having a higher pressure of the first oil passage 124 and the second oil passage 125 reaches a set pressure or higher, release the pressure toward the oil passage having a lower pressure. Check valves 137 are provided at locations in which the safety valves 136 are disposed. The configuration is such that an oil passage having a lower pressure of the first oil passage 124 and the second oil passage 125 is supplied with oil having a pressure set at a charge relief valve 138.

The variable displacement pump 120 is configured so as to continuously change the operation angle of a pump swash plate 120c by actuating a transmission cylinder 128. The transmission cylinder 128 is configured as a double-acting hydraulic cylinder that includes a pair of compression springs 129 for applying a force to return the transmission cylinder 128 to a neutral state in which the operation angle of the pump swash plate 120c becomes zero. A forward-traveling transmission valve 130 and a reverse-traveling transmission valve 131 of an electromagnetic operation type for controlling the actuation of the transmission cylinder 128 are provided, and the actuation of the transmission valves 130 and 131 is controlled by a controller (outside the drawing).

The variable displacement motor 121 is configured such that, with the actuation of a low speed cylinder 132 and a high speed cylinder 133, the operation angle of a motor swash plate 121c can be switched between two high and low stages, namely a low speed stage in which the angle is set to a set angle for low speed and a high speed stage in which the angle is set to a set angle for high speed. The low speed cylinder 132 and the high speed cylinder 133 are each configured as a single-acting hydraulic cylinder, and a transmission valve 134 of a pilot operation type for controlling the actuation of the low speed cylinder 132 and the high speed cylinder 133 is provided. Furthermore, a transmission operation valve 135 of an electromagnetic operation type for controlling the actuation of the transmission valve 134 is provided, and the actuation of the transmission operation valve 135 is controlled by a controller (outside the drawing).

In order to supply charge oil to the closed circuit P of the first oil passage 124 and the second oil passage 125, a charge pump 126 and a charge oil supply passage 127 that supplies charge oil ejected from the charge pump 126 are provided. The charge pump 126 is configured so as to be driven by the motive power from the engine 101. The charge oil supply passage 127 includes not only the charge pump 126 but also a main filter 140 and an HST filter 141, and supplies charge oil that has passed through these two filters to the closed circuit P. Furthermore, in the charge oil supply passage 127, the main filter 140, the charge pump 126, and the HST filter 141 are arranged in this order sequentially from the upstream side in the charge oil flow direction.

Figure 13:
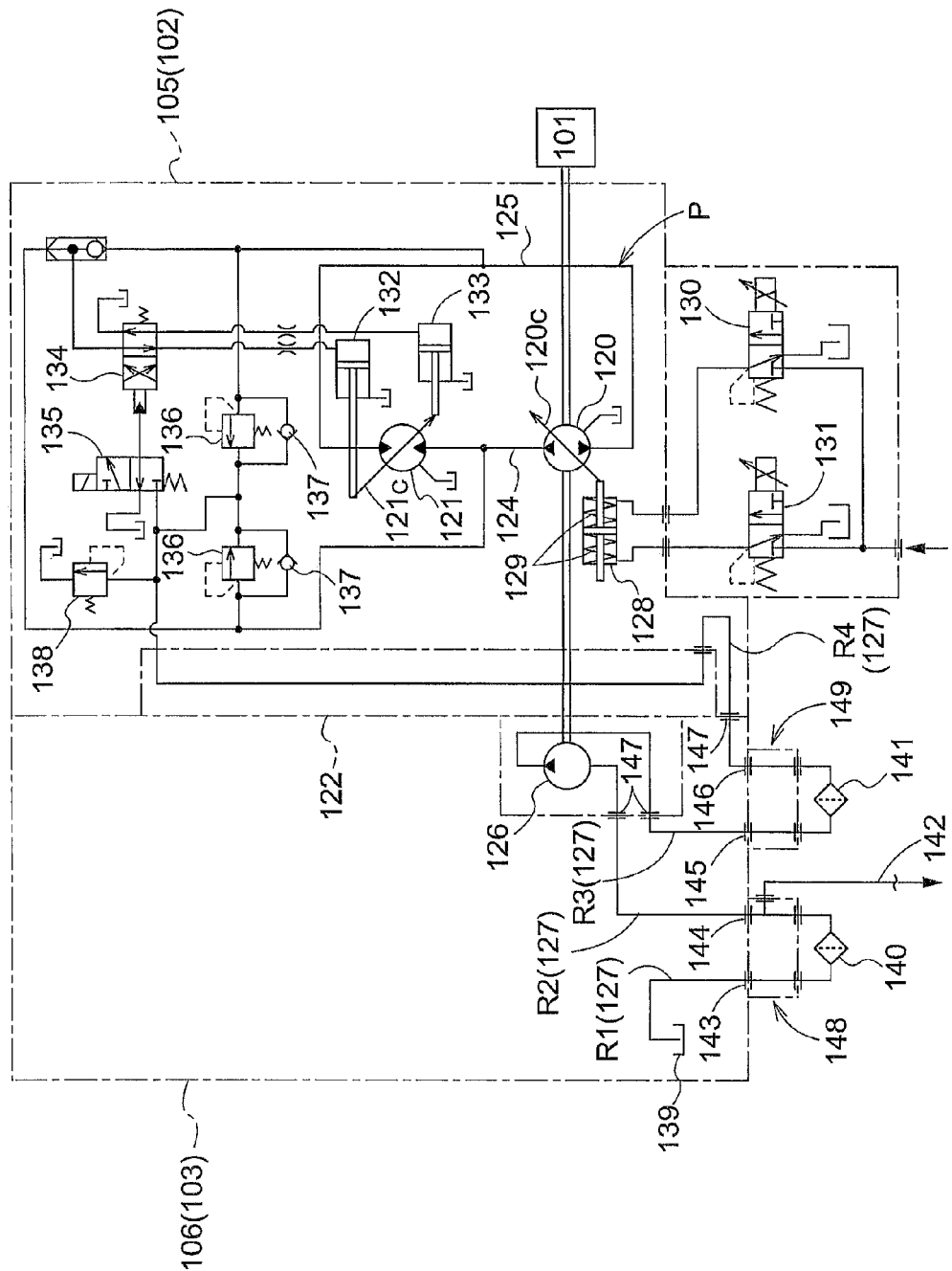
FIG. 13 is a diagram showing a hydraulic circuit of a hydrostatic continuously variable transmission.

As shown in FIGS. 12 and 13, the charge pump 126 is disposed inside the T/M case 103 on the end portion (rear end portion) of the port block 122 on the side on which the T/M case 103 is positioned. As shown in FIGS. 11 and 13, the main filter 140 and the HST filter 141 are arranged adjacent to each other in the vehicle body front-rear direction in one of the lateral side portions (right side face) of the T/M case 103. The charge oil supply passage 127 forms a channel from an oil supply source 139 to the closed circuit P, by connecting an internal channel that is formed through the transmission casing 105, the port block 122, and the T/M case 103, and the main filter 140 and the HST filter 141 that are installed outside the T/M case 103.

The charge oil supply passage 127 includes a first channel section R1 that connects the oil supply source 139 and the main filter 140, a second channel section R2 that connects the main filter 140 and the charge pump 126, a third channel section R3 that connects the charge pump 126 and the HST filter 141, and a fourth channel section R4 that connects the HST filter 141 and the closed circuit P. Furthermore, the second channel section R2 branches into a branch supply passage 142 that supplies oil that has passed through the main filter 140 to a main pump (outside the drawing). Accordingly, the configuration is such that oil that has passed through the main filter 140 can be supplied also to other hydraulic units (e.g., a power steering unit or a hydraulic elevation unit for vertically moving a working apparatus, etc.).

The first channel section R1 is configured as an internal channel formed by casting through the T/M case 103, and, as shown in FIGS. 13 and 17, its end portion on the downstream side in the charge oil flow direction is interconnected to a main supply opening 143 that is formed in one of the lateral side portions (right side face) of the T/M case 103. The main supply opening 143 is for allowing oil from the T/M case 103 to be supplied to the main filter 140.

Figure 15:
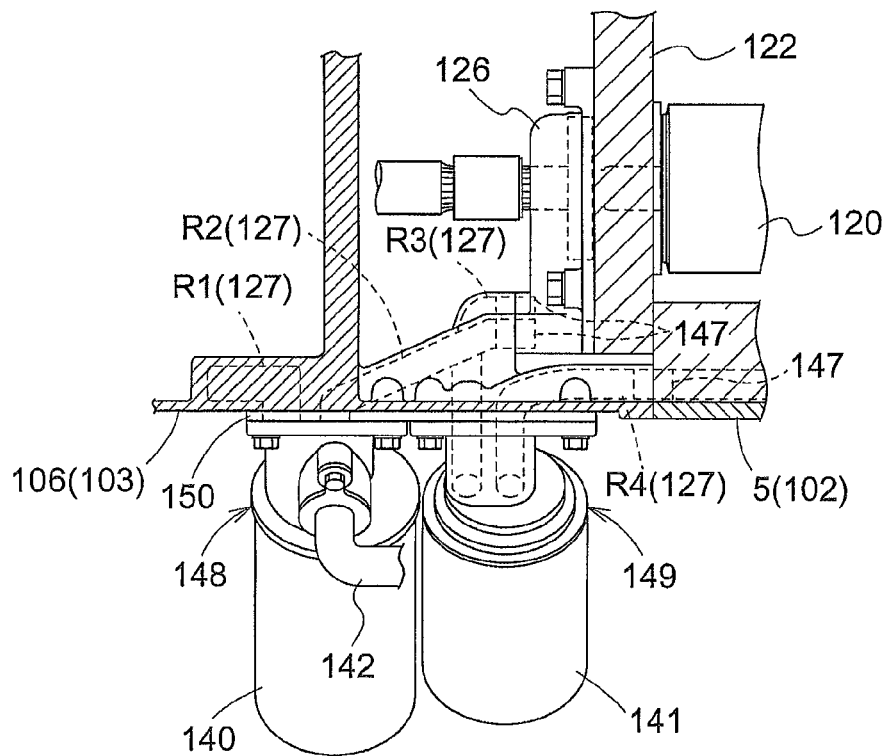
FIG. 15 is a cross-sectional view showing the main portion of the T/M case when viewed from above.

The second channel section R2 is configured as an internal channel formed by casting through the T/M case 103, and its end portion on the upstream side in the charge oil flow direction is interconnected to a main receiving opening 144 that is formed in one of the lateral side portions (right side face) of the T/M case 103. The main receiving opening 144 is for allowing oil discharged from the main filter 140 to be received by the T/M case 103. The end portion of the second channel section R2 on the downstream side in the charge oil flow direction is connected via a connection sleeve 147 to the charge pump 126. At that time, the flow direction of oil received from the main receiving opening 144 and the flow direction of oil in the charge pump 126 are orthogonal to each other. Thus, as shown in FIGS. 15 and 17, the second channel section R2 is formed so as to be bent such that the flow direction of oil received from the main receiving opening 144 is changed to its orthogonal direction. Such a bent channel section is not formed by bending the cylindrical member such as a pipe but is formed by casting, and, thus, the channel section can be easily kept oil-tight. This second channel section corresponds to a charge pump supply section.

The third channel section R3 is configured as an internal channel formed by casting through the T/M case 103, and its end portion on the upstream side in the charge oil flow direction is connected via a connection sleeve 147 to the charge pump 126. The connection sleeve 147 is for connecting channels and is held at a desired position using an O ring or the like. The end portion of the third channel section R3 on the downstream side in the charge oil flow direction is interconnected to an HST supply opening 145 that is formed in one of the lateral side portions (right side face) of the T/M case 103. The HST supply opening 145 is for allowing oil from the T/M case 103 to be supplied to the HST filter 141. As in the case of the second channel section R2, the third channel section R3 is formed so as to be bent such that the flow direction of oil ejected from the charge pump 126 is changed to its orthogonal direction. The third channel section R3 corresponds to a charge pump discharge section.

The fourth channel section R4 is configured by connecting an internal channel formed by casting through the T/M case 103, an internal channel that is formed through the transmission casing 105, and an internal channel that is formed through the port block 122, using connection sleeves 147 or the like. The end portion of the fourth channel section R4 on the upstream side in the charge oil flow direction is interconnected to an HST receiving opening 146 that is formed in one of the lateral side portions (right side face) of the T/M case 103. The HST receiving opening 146 is for allowing oil discharged from the HST filter 141 to be received by the T/M case 103.

Figure 14:
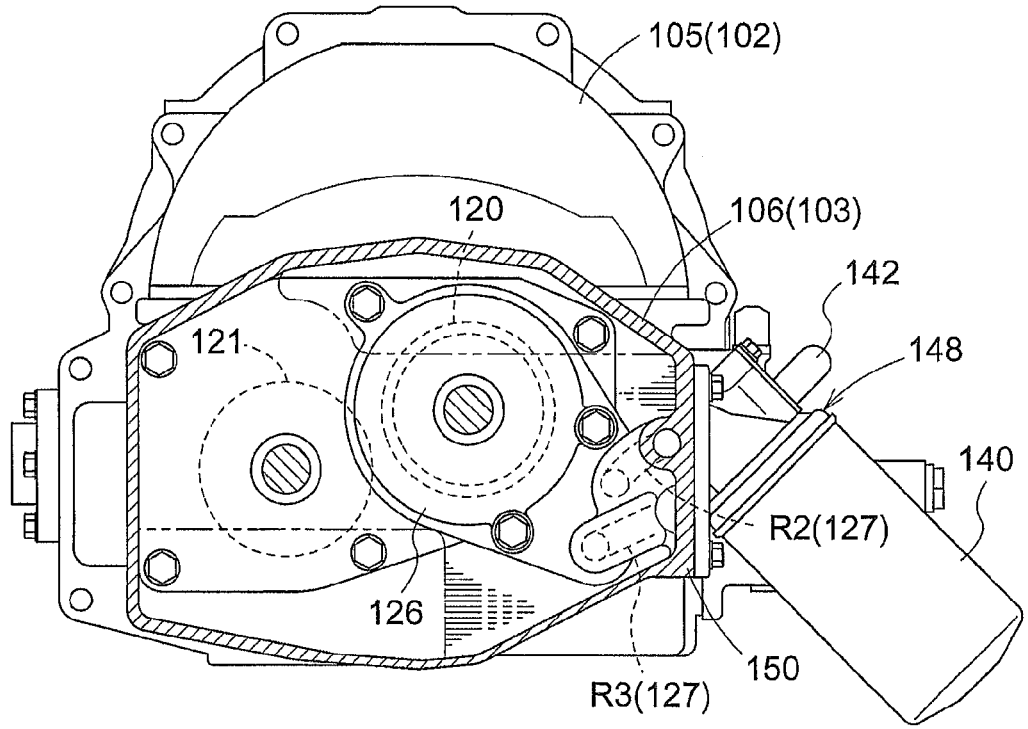
FIG. 14 is a cross-sectional view showing the main portion of a T/M case.

Hereinafter, installation of the main filter 140 and the HST filter 141 will be described with reference to FIGS. 14 to 17. FIG. 14 is a cross-sectional view showing the main portion of the T/M case 103, and FIG. 15 is a cross-sectional view showing the main portion of the T/M case 103 when viewed from above. FIG. 16 is a vertical cross-sectional rear view showing an area near a location in which the main filter 140 and the HST filter 141 are installed. FIG. 17 is a cross-sectional view showing an enlarged area near a location in which the main filter 140 and the HST filter 141 are installed in FIG. 13.

One of the lateral side portions (right side face) of the T/M case 103 is formed in the shape of a flat plate on which a main installation location 148 for installation of the main filter 140 and an HST installation location 149 for installation of the HST filter 141 are arranged adjacent to each other in the vehicle body front-rear direction. An attachment face portion 150 is provided so as to extend between the main installation location 148 and the HST installation location 149, and the main filter 140 and the HST filter 141 are configured such that they can be threaded and attached via the attachment face portion 150. The main installation location 148 includes the main supply opening 143 and the main receiving opening 144 that are arranged adjacent to each other in the vehicle body front-rear direction. The HST installation location 149 includes the HST supply opening 145 and the HST receiving opening 146 that are arranged adjacent to each other in the vehicle body front-rear direction. Both the filters 140 and 141 are formed in the shape of columns whose center portion respectively include discharge openings 140b and 141b, and suction openings 140a and 141a are arranged respectively around the discharge openings 140b and 141b.

As shown in FIG. 17, the main filter 140 is installed such that oil supplied from the main supply opening 143 is sucked through the suction opening 140a and is discharged via the discharge opening 140b to the main receiving opening 144. In order to install the main filter 140 in this manner, it is sufficient that the main supply opening 143 and the suction opening 140a are directly interconnected to each other in an opposing manner and that the main receiving opening 144 and the discharge opening 140b are directly interconnected to each other in an opposing manner, and, thus, the main filter 140 can be easily installed in an oil-tight manner in the lateral side portion of the T/M case 103. Furthermore, as shown in FIGS. 14 and 15, the branch supply passage 142 is branched from a location in which the attachment face portion 150 and the main filter 140 are connect to each other, and is configured so as to supply oil that has passed through the main filter 140 to a main pump (outside the drawing). The branch supply passage 142 extends from the branching location to a point above the main filter 140, and further extends along the vehicle body front-rear direction.

Also, the HST filter 141 is installed such oil supplied from the HST supply opening 145 is sucked through the suction opening 141a and is discharged via the discharge opening 141b to the HST receiving opening 146. As in the case of the main filter 140, in order to install the HST filter 141, it is sufficient that the HST supply opening 145 and the suction opening 141a are directly interconnected to each other in an opposing manner and that the HST receiving opening 146 and the discharge opening 141b are directly interconnected to each other in an opposing manner, and, thus, the HST filter 141 can be easily installed in an oil-tight manner.

As shown in FIGS. 9 and 16, a boarding step 152 that covers the clutch housing 102 and the T/M case 103 from above is provided, and a driver's boarding station 151 is formed on the boarding step 152. The main filter 140 and the HST filter 141 are accommodated in accommodation spaces 153 that are formed on the back face side (lower side) of the boarding step 152. A region on the back face side (lower side) of the boarding step 152 is divided by the T/M case 103 into the left and right accommodation spaces 153. The right accommodation space 153 accommodates the main filter 140 and the HST filter 141 that are detachably attached to the right side face of the T/M case 103. Furthermore, the right accommodation space 153 accommodates not only the main filter 140 and the HST filter 141 but also a fuel tank 154, and the left accommodation space 153 accommodates another fuel tank 154. In the right accommodation space 153, the fuel tank 154 is disposed so as to be positioned on the outer side of the main filter 140 and the HST filter 141 in the vehicle body lateral width direction, and the main filter 140, the HST filter 141, and the fuel tank 154 are arranged so as to overlap each other when viewed from a side. In this manner, the right accommodation space 153 on the back face side (lower side) of the boarding step 152 accommodates the main filter 140, the HST filter 141, and the fuel tank 154 such that they are arranged in line in the vehicle body lateral width direction. Here, an example is shown in which not only the main filter 140 and the HST filter 141 but also the fuel tank 154 is accommodated as a member accommodated in the accommodation space 153, but, for example, other members such as a battery also may be accommodated.

As shown in FIGS. 14 and 15, the main filter 140 is configured such that it is attachable at an inclined posture in which the tip of the main filter 140 is positioned lower than the base thereof on the main installation location 148. Also, the HST filter 141 is configured such that it is attachable at an inclined posture in which the tip of the HST filter 141 is positioned lower than the base thereof on the HST installation location 149. For example, both the filters 140 and 141 are attachable at an inclined posture by a set inclination angle (45 degrees) with respect to the ground or the like. When the main filter 140 and the HST filter 141 are attached at an inclined posture in this manner, the installation space in the vehicle body lateral width direction can be reduced, and the suction openings 140a and 141a of the filters 140 and 141 can be positioned lower than the oil surface, so that entrapment of air in both the filters 140 and 141 can be suppressed. Moreover, when replacing the filters 140 and 141 due to maintenance or the like, these filters can be detached in a direction obliquely downward from the installation locations 148 and 149, and the filters can be attached in a direction obliquely upward from the ground or the like toward the installation locations 148 and 149. Accordingly, as long as a space corresponding to the amount of the main filter 140 and the HST filter 141 to be threaded in the inclined direction when threading and attaching the filters is ensured, both the filters 140 and 141 can be attached and detached to and from the T/M case 103 using an empty space below the installation locations 148 and 149. Thus, even when the main filter 140, the HST filter 141, and the fuel tank 154 are arranged in line in the vehicle body lateral width direction in the accommodation space 153 as shown in FIG. 16 as described above, both the filters 140 and 141 can be detached and attached while suppressing interference with other members such as the fuel tank 154, that is, both the filters 140 and 141 can be properly arranged in a limited space, and can be easily replaced.

Other Embodiments (1) In the foregoing embodiment, an example is shown in which the charge oil supply passage 127 is configured as an internal channel that is formed inside the walls of the T/M case 103, the transmission casing 105, and the port block 122. Alternatively, the charge oil supply passage may be configured, for example, as a cylindrical member such as a pipe that is disposed inside the T/M case 103, the transmission casing 105, and the port block 122.

(2) In the foregoing embodiment, an example is shown in which the present invention is applied to a tractor as a working vehicle, but it may be applied to other various working vehicles.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A working vehicle, comprising:
a boarding step;
an accommodation space positioned on a back face side of the boarding step; and
a cover member that is detachably attached to a laterally outer end portion of the boarding step, including
a vertically oriented cover face that covers the accommodation space from a laterally outer side,
an upper end extending portion that extends from an upper end of the cover face toward the boarding step,
a front end extending portion that extends from a front end of the cover face toward the boarding step, and
a rear end extending portion that extends from a rear end of the cover face toward the boarding step;
wherein the cover member has an outer edge portion configured by the upper end extending portion, the front end extending portion, and the rear end extending portion in which a front end of the upper end extending portion and an upper end of the front end extending portion are connect to each other, and a rear end of the upper end extending portion and an upper end of the rear end extending portion are connected to each other.

2. The working vehicle according to claim 1,
wherein the boarding step has reinforcing portions that extend downward from both front and rear end portions of left and right ends of a step face of the boarding step, and
the upper end extending portion, the front end extending portion, and the rear end extending portion respectively function as linkage portions that are linked to corresponding locations of the step face and the front and rear reinforcing portions of the boarding step.

3. The working vehicle according to claim 1, wherein the cover member is provided with an auxiliary step for boarding and alighting from the boarding step.

4. The working vehicle according to claim 3,
wherein the cover face has an opening through which an arm portion extending upward from a step portion of the auxiliary step is allowed to be inserted, and
an extending end of the arm portion inserted through the opening is welded to the upper end extending portion, and a portion of the arm portion inserted through the opening, adjacent to a peripheral edge portion of the opening, is welded to the peripheral edge portion.

5. A working vehicle, comprising:
a transmission case (hereinafter, abbreviated as a T/M case);
a hydrostatic continuously variable transmission;
a transmission casing that accommodates the hydrostatic continuously variable transmission;
a port block that is linked to an end portion of the transmission casing on a side on which the T/M case is positioned;
a charge oil supply passage that is provided through the transmission casing, the port block, and the T/M case, and that supplies charge oil to the hydrostatic continuously variable transmission;
a main filter;
a charge pump; and
an HST filter;
wherein the main filter, the charge pump, and the HST filter are arranged on the charge oil supply passage in this order from an upstream side in a charge oil flow direction,
in one of the lateral side portions of the T/M case, a main installation location for installation of the main filter and an HST installation location for installation of the HST filter are arranged adjacent to each other,
the main installation location is provided with a main supply opening that allows oil to be supplied from the T/M case to the main filter, and a main receiving opening that allows oil discharged from the main filter to be received by the T/M case, and
the HST installation location is provided with an HST supply opening that allows oil to be supplied from the T/M case to the HST filter, and an HST receiving opening that allows oil discharged from the HST filter to be received by the T/M case.

6. The working vehicle according to claim 5,
wherein the charge pump is disposed on an end portion of the port block on a side on which the T/M case is positioned,
the charge oil supply passage has a charge pump supply section that extends from the main receiving opening to the charge pump and that is formed so as to be bent to change a flow direction of oil,
the charge oil supply passage further has a charge pump discharge section that extends from charge pump to the HST supply opening and that is formed so as to be bent to change a flow direction of oil, and
the charge pump supply section and the charge pump discharge section are configured as an internal channel formed inside a wall of the T/M case.

7. The working vehicle according to claim 5,
wherein the main filter is configured to be attachable at an inclined posture in which a tip of the main filter is positioned lower than a base thereof on the main installation location, and
the HST filter is configured to be attachable at an inclined posture in which a tip of the HST filter is positioned lower than a base thereof on the HST installation location.

* * * * *